United States Patent [19]
Takei et al.

[11] Patent Number: 6,119,484
[45] Date of Patent: Sep. 19, 2000

[54] VACUUM DEGASSING APPARATUS FOR MOLTEN GLASS

[75] Inventors: Yusuke Takei, Tokyo; Masataka Matsuwaki, Yokohama; Toshiyasu Kawaguchi, Yokohama; Takashi Kijima, Yokohama; Atsushi Tanigaki, Yokohama, all of Japan; Katsuharu Imamaki, Dalian, China; Michito Sasaki; Toshihiro Ishino, both of Yokohama, Japan

[73] Assignee: Asahi Glass Company Ltd., Tokyo, Japan

[21] Appl. No.: 09/164,356

[22] Filed: Oct. 1, 1998

[30] Foreign Application Priority Data

| Oct. 6, 1997 | [JP] | Japan | 9-272816 |
|---|---|---|---|
| Oct. 27, 1997 | [JP] | Japan | 9-293939 |
| Nov. 7, 1997 | [JP] | Japan | 9-305326 |
| Feb. 26, 1998 | [JP] | Japan | 10-044926 |
| Aug. 19, 1998 | [JP] | Japan | 10-232744 |

[51] Int. Cl.[7] .................................................. C03B 5/42
[52] U.S. Cl. .................... 65/134.2; 65/157; 65/374.12; 65/374.13
[58] Field of Search .................. 65/32.1, 134.2, 65/157, 374.13, 374.12

[56] References Cited

U.S. PATENT DOCUMENTS

| 1,598,308 | 8/1926 | Pike | 65/134.2 |
|---|---|---|---|
| 2,196,075 | 4/1940 | Logan et al. | 501/127 |
| 3,519,412 | 7/1970 | Olink | 65/337 |
| 4,838,919 | 6/1989 | Kunkle et al. | 65/17.3 |
| 5,316,563 | 5/1994 | Ishimura et al. | 65/32.5 |
| 5,849,058 | 12/1998 | Takeshita et al. | 65/134.2 |
| 5,851,258 | 12/1998 | Ando et al. | 65/329 |

FOREIGN PATENT DOCUMENTS

| 0 186 972 | 7/1986 | European Pat. Off. . |
|---|---|---|
| 0 556 576 | 8/1993 | European Pat. Off. . |
| 0 579 524 | 2/1997 | European Pat. Off. . |
| 2-221129 | 4/1990 | Japan . |
| 2-221129 | 9/1990 | Japan . |

(List continued on next page.)

OTHER PUBLICATIONS

Patent Abstracts of Japan, vol. 14, No. 531 (C–780), Nov. 21, 1990, JP 02 221129, Sep. 4, 1990.

Von Paul P. Boggum, Glastechnische Berichte, vol. 51, No. 11, pp. 303–306, "Wannensteine Zwischen Heute Und Morgen", Nov. 1978.

T. S. Busby, Glass Technology, vol. 20, No. 4, pp. 117–131, "Progress of Glass Making Refractories", Aug. 1979.

Anthony J. Merchant, Glass Industry, vol. 68, No. 10, pp. 27, 28, 31 and 37, "Building Longer Life Into Electric Melters", Sep. 1987.

I. R. Whittaker, Glass Technology, vol. 34, No. 4, pp. 129–135, "Fusion Cast Refractories for the Glass Industry", Aug. 1, 1993.

Primary Examiner—Sean Vincent
Attorney, Agent, or Firm—Oblon, Spivak, McClelland, Maier & Neustadt, P.C.

[57] ABSTRACT

A vacuum degassing apparatus for molten glass includes a vacuum housing where a vacuum is created; a vacuum degassing vessel housed in the vacuum housing to degas the molten glass; an introduction device communicated to the vacuum degassing vessel so as to introduce untreated molten glass into the vacuum degassing vessel, or preferably an uprising pipe; and a discharge device to discharge treated molten glass from the vacuum degassing vessel, or preferably a downfalling pipe. In the apparatus, at least a portion of at least one of the vacuum degassing vessel, the uprising pipe and the downfalling pipe that directly contact the molten glass is constituted by refractory material having a porosity of not greater than 5%. The apparatus can increase quantity of flow of the molten glass and consequently a degassing throughput of the molten glass, having the same size and the same pressure loss. The apparatus can further increase the quantity of flow and the degassing throughput without making the size of the apparatus excessively larger.

16 Claims, 11 Drawing Sheets

FOREIGN PATENT DOCUMENTS

| | | |
|---|---|---|
| 3-033020 | 2/1991 | Japan . |
| 3-069516 | 3/1991 | Japan . |
| 4-031325 | 2/1992 | Japan . |
| 5-058646 | 3/1993 | Japan . |
| 5-208830 | 8/1993 | Japan . |
| 5-208845 | 8/1993 | Japan . |
| 5-229831 | 9/1993 | Japan . |
| 6-305735 | 11/1994 | Japan . |

VACUUM DEGASSING APPARATUS FOR MOLTEN GLASS

BACKGROUND OF THE INVENTION

1. Field of the Invention

The present invention relates to a vacuum degassing apparatus for molten glass which removes bubbles from molten glass continuously supplied.

2. Discussion of Background

In order to improve the quality of formed glass products, there has been used a vacuum degassing apparatus which removes bubbles generated in molten glass before the molten glass which has been molten in a melting furnace is formed by a forming apparatus. Such a conventional vacuum degassing apparatus is shown in FIG. 12.

The vacuum degassing apparatus 200 shown in FIG. 12 is used in a process wherein molten glass C in a melting tank 212 is vacuum-degassed and is continuously supplied to a successive treating vessel (not shown), e.g. a treating vessel for plate glass such as a floating bath and an operating vessel for bottles. A vacuum housing 202 where a vacuum is created has a vacuum degassing vessel 204 substantially horizontally housed therein, and an uprising pipe 206 and a downfalling pipe 208 housed in both ends thereof so as to extend vertically and downwardly. The uprising pipe 206 has a lower end immersed in the molten glass G in an upstream pit 214 which communicates with the melting tank 212. The downfalling pipe 208 also has a lower end immersed in the molten glass G in a downstream pit 216 which communicates with the successive treating vessel (not shown).

The uprising pipe 206 communicates with the vacuum degassing vessel 204. The molten glass G before degassing is drawn up from the melting tank 212 into the vacuum degassing vessel 204. The downfalling pipe 208 communicates with the vacuum degassing vessel 204. The molten glass G after degassing is drawn down from the vacuum degassing vessel 204 and is led to the successive treating vessel (not shown). In the vacuum housing 202, thermal insulation material 210 such as bricks for thermal insulation is provided around the vacuum degassing vessel 204, the uprising pipe 206 and the downfalling pipe 208 to cover these parts for thermal insulation. The vacuum housing 202 may be made of metal such as stainless steel. The vacuum housing is evacuated by a vacuum pump (not shown) to maintain the inside of the vacuum degassing vessel 204 therein in a depressurized state such as a pressure of $1/20-1/3$ atmosphere. As a result, the molten glass G before degassing in the upstream pit 214 is sucked up by the uprising pipe 206 to be introduced into the vacuum degassing vessel 204. After the molten glass is vacuum-degassed in the vacuum degassing vessel 204, the molten glass is withdrawn down by the downfalling pipe 208 to be led into the downstream pit 216.

In the conventional vacuum degassing apparatus 200, the molten glass G that has a high temperature such as a temperature between 1200–1400° C. is treated. In order to deal with such a high temperature treatment, portions in direct contact with the molten glass G such as the vacuum degassing vessel 204, the uprising pipe 206 and the downfalling pipe 208 are constituted by circular shells which are normally made of noble metal such as platinum, and platinum-rhodium and platinum-palladium as platinum alloy, as disclosed in JP-A-2221129 in the name of the applicants. The applicants have used circular shells of platinum alloy for these members to put the vacuum degassing apparatus into practice.

The reason why these members are constituted by the circular shells made of noble metal such as platinum alloy is that not only the molten glass G is at a high temperature but also a low reactivity of the noble metal with the molten glass at a high temperature prevents the molten glass from being made to be heterogeneous by reaction with the molten glass, that there is no possibility of mixing impurities into the molten glass G, and that required strength can be ensured to some degree at a high temperature. In particular, the reason why the vacuum degassing vessel 204 is constituted by a circular shell made of noble metal is that the circular shell is self-heated by flowing an electric current in the circular shell per se, and the molten glass G in the shell is uniformly heated to maintain the temperature of the molten glass G at a certain temperature, in addition to the reasons as just stated.

When the vacuum degassing vessel 204 is made of noble metal, a circular shell is appropriate in terms of mechanical strength such as high temperature strength. Since noble metal such as platinum is too expensive to increase the wall thickness, the circular shell has a limited diameter and can not be formed in a large size because of both of cost and strength. This has created a problem in that the vacuum degassing apparatus can not be formed so as to have a large quantity of flow because of the presence of a limited quantity of flow of the molten glass G which can be degassed by the vacuum degassing vessel 204. If the vacuum degassing vessel 204 in a circular shell has the entire length thereof extended and the current of the molten glass is increased to make the volume larger so as to increase a degassing throughput, there has been created a problem in that the apparatus is extended and cost is raised. That is to say, there has been created in a problem in that the degassing throughput (the quantity of flow) of the molten glass G in the vacuum degassing apparatus can not be made large.

Since the molten glass G is obtained by dissolution reaction of powdered raw materials, it is preferable that the temperature in the melting vessel 212 is high in terms of dissolution and that the viscosity of the molten glass is low or the temperature of the molten glass is high in terms of vacuum-degassing. Although the conventional vacuum degassing apparatus 200 requires to use alloy made of noble metal in the vacuum degassing vessel 204 and the like in terms of high temperature strength, it is difficult to increase the wall thickness of the circular shells in terms of cost because such alloy is expensive. Even if noble metal such as platinum is used, the temperature of the molten glass at an inlet of the vacuum degassing apparatus 200 has been limited to a certain temperature (1200–1400° C.) as stated earlier.

The appropriate temperature at which a forming machine (forming treatment vessel) forms the molten glass after degassing has been limited to a certain temperature though the temperature varies depending on articles to be formed, such as plate glass and bottles to be formed. When noble metal is used to form the vacuum degassing vessel 204, the temperature of the molten glass G at the inlet of the vacuum degassing apparatus 200 has been restricted to a temperature lower than 1400° C. This has created a problem in that a drop in temperature of the molten glass G in the vacuum degassing apparatus 200 decreases the temperature of the molten glass G at an outlet of the vacuum degassing apparatus 200 to a lower temperature than the temperature required for forming since the quantity of flow (throughput) can not be made greater and the quantity of heat carried in by the molten glass G is not so large. This requires that the molten glass G in the vacuum degassing vessel 204 be uniformly heated as stated earlier. For this uniform heating, the vacuum degassing vessel 204 per se is required to be constituted by a circular shell made of noble metal, causing the problem in that it is difficult to increase the throughput as stated earlier.

In order to cope with these problems, a proposal has been made to use inexpensive refractory material such as firebricks in paths of the vacuum degassing vessel 204, the uprising pipe 206 and the downfalling pipe 208 instead of using expensive noble metal material such as platinum alloy.

There has been known a bubble forming phenomenon that use of refractory material in the melting furnace generates fine bubbles from the surface of the refractory at an initial stage when the refractory used as the refractory material directly contacts with the molten glass. These bubbles are classified into two kinds of bubbles, one kind of the bubbles that are generated as carbon dioxide ($CO_2$) gas or nitrogen ($N_2$) gas by combination of oxygen with carbon, carbide or nitride as impurities on a surface of the refractory because of the presence of a reduced state on the surface of the refractory in touch with the molten glass, and the other kind of the bubbles that are generated from the surface of the refractory because gas in the pores in the refractory contacts with the molten glass.

In general, as the pores in the refractory, there are open pores (apparent pores) that open to the outer surface of the refractory and closed pores that do not open to the outer surface and exist independently. When the vacuum degassing apparatus 200 is prepared from a refractory which has at least one kind of pores, the gas included in the pores promptly becomes bubbles at initial contact with the molten glass and a small amount of bubbles are generated from the pores after that in the case of the open pores. In the case of closed pores, the gas included in the pores is prevented from promptly becoming bubbles at the initial contact between the refractory and the molten glass. However, it is supposed that the surface of the refractory is gradually worm out by erosion and the closed pores in the refractory accordingly contact with the molten glass to gradually make bubbles originating from the gas included in the pores.

When the refractory material is used for a path in the vacuum degassing apparatus 200, there is a possibility that bubbles are intermittently generated from the refractory material for a long period of time even after commencement of operation.

When the refractory material is used for a path in the vacuum degassing apparatus, the temperature of the molten glass G is proposed to be set at about 1200–1400° C. in order to avoid a change in the conventional vacuum-degassing treatment conditions with platinum used as the refractory material and to prevent the erosion of the refractory material from being accelerated by increasing the temperature of the molten glass to a high temperature. This degassing treatment temperature, (about 1200–1400° C.) is relatively lower than the temperature in the conventional degassing treatment process with only a refiner used, that is to say, the degassing treatment temperature, (about 1400–1500° C.) in a process wherein bubbles are grown by the refiner, and the bubbles are rising in the molten glass to be eventually broken on the liquid surface of the molten glass for degassing. It is supposed that, in the vacuum degassing apparatus with the refractory material used in the path for the molten glass, the erosion rate of the refractory material used in the path is so small that the closed pores in the refractory are scarcely exposed on the surface of the refractory to generate bubbles.

However, the vacuum degassing apparatus with refractory material used in the path has created a problem in that the viscosity of the molten glass G is high in comparison with the degassing treatment with the refiner used since the degassing treatment is carried out at a lower temperature than the degassing treatment temperature in the conventional refining step with only the refiner used, and that the bubbles which have generated on the surface of the refractory have too small a rising speed to sweep a possibility of insufficient degassing.

If the vacuum degassing vessel 204, the uprising pipe 206 and the downfalling pipe 208 are built from more inexpensive refractory material than noble alloy, and if the molten glass can be continuously vacuum-degassed as in the case of use of noble alloy, it would not necessary to restrict material use in terms of cost or to restrict the size in terms of decreased strength caused by the restriction of the material use in comparison with the case of use of noble alloy such as platinum. Design freedom would be remarkably improved not only to become capable of construct the vacuum degassing apparatus in a large quantity of flow but also to become capable of vacuum-degassing at a higher temperature.

However, if all constituent parts in the vacuum degassing apparatus 200 are built from firebricks, the following problem are raised. Since nothing supports a pipe-like open end such as the lower end of the uprising pipe 206 or the downfalling pipe 208, it is necessary to support heavy firebricks only by the adhesive power of bond, which is difficult to obtain sufficient strength. If the firebricks are prepared in a long cylindrical shape, the cost is remarkably increased. Under the circumstances, it is practically difficult to build the lower end of the uprising pipe 206 or the downfalling pipe 208 from firebricks.

Even if the lower end of the uprising pipe 206 or the downfalling pipe 208 is built from firebricks, there are created problems in that damage or deterioration is likely to cause at joints between firebricks, and that the firebricks are reactive and likely to be selectively deteriorated at a position in the vicinity of an interface between the molten glass G and air in the melting vessel 212 because of presence of a high temperature and the air at that position. The deterioration at the joints or the interface could deform the lower end of the uprising pipe 206 or the downfalling pipe 208 in an unequal shape in the direction of height, damage such as breakage could be caused, and the lower end of the uprising pipe 206 or the downfalling pipe 208 could be partly broken and fallen out, causing a problem in that sufficient durability can not be obtained. If broken firebricks are mixed into the molten glass G, there is caused a problem in that it is impossible to hold homogeneous composition in the glass.

When the path for the molten glass having a high temperature is made of platinum as in the conventional vacuum degassing apparatus, the formation of holes due to wearing of the thin platinum must be taken into account at designing, and the apparatus is required to enable repair and replacement of platinum for a short period of time after the production of glass products has been temporary standstill. For repair and replacement of the path, it has been necessary to release the reduced state and expel all the molten glass from the inside of the vacuum vessel, the uprising pipe and the downfalling pipe, to drop the temperature of the entire vacuum apparatus to an ordinary temperature, and then to carry out repair or replacement of platinum. Since it is appropriate that the molten glass is cut at the lower ends of the uprising pipe and the downfalling pipe for repair or replacement of platinum, the vacuum degassing apparatus has been required to have a structure that the entire apparatus can be lifted by at least 1 m to separate the uprising pipe and the downfalling pipe from the high temperature glass reservoirs thereunder when the uprising pipe and the downfalling pipe are repaired. However, lifting the entire vacuum degassing apparatus 200 having a solid structure has required an extremely difficult operation accompanied by danger since the apparatus is large and extremely heavy and the apparatus is put under the reduced state at a high temperature during operation.

As stated earlier, the paths of the molten glass such as the vacuum degassing vessel 204, the uprising pipe 206 and the downfalling pipe 208 that directly contact with the molten glass G have been made of platinum or platinum alloy such as platinum-rhodium in the conventional vacuum degassing apparatus 200. Although noble metal or its alloy such as platinum or platinum alloy is good at resistance to high temperature and high temperature strength in comparison with other metal, noble metal or its alloy has inherent limitations. In order to make the vacuum degassing vessel 204, the uprising pipe 206 and the downfalling pipe 208 larger, it is necessary to make the wall thickness of the vessel and the pipes thicker. However, noble alloy such as platinum is extremely expensive, and the production of the vacuum degassing apparatus 200 becomes remarkably costly. The cost of the apparatus tremendously increases because a larger size of the apparatus requires thicker wall for the vessel and the pipes. In the case of use of noble alloy metal, there are limitations to enlargement of the apparatus in terms of cost.

This has created a problem in that it is impossible to build the vacuum degassing apparatus so as to have a large quantity of flow because of the limitations in the quantity of flow of the molten glass G which can be degassed in the vacuum degassing vessel 204.

As explained, the conventional vacuum degassing apparatus is costly in construction and can not be built so as to provide a large quantity of flow though the degassing efficiency of the molten glass is extremely high. As a result, the conventional vacuum degassing apparatus has been mainly used for glass which has a specialized application such as an optical use and an electronic use wherein the presence of fine bubbles is not acceptable, and which is produced in small-quantity production.

As stated earlier, it is preferable that the temperature in the melting vessel is high when glass is molten in the melting vessel, and it is also preferable that the temperature of the melting vessel is high when the vacuum degassing treatment is carried out. Even if noble metal such as platinum is used, the strength necessarily becomes lower as the temperature becomes higher. An increase in the wall thickness of the vacuum degassing vessel directly contributes to an increase in cost. Under the circumstances, the temperature of the molten glass at the inlet of the vacuum degassing apparatus has been limited to 1200–1400° C., and has been enable to be raised to a desired temperature.

On the other hand, it has recently been required that a vacuum degassing apparatus having a high degassing efficiency is used to carry out a degassing treatment for mass-quantity production of glass such as glass for construction or automobiles. As the vacuum degassing vessel, the uprising pipe and the downfalling pipe are prepared from noble metal alloy such as platinum, it is not acceptable in terms of cost to use the conventional vacuum degassing apparatus with noble metal used therein for preparation of glass to be produced in mass production since noble metal such as platinum is extremely high.

If the vacuum degassing vessel 204, the uprising pipe 206 and the downfalling pipe 208 are constituted by refractory material in the conventional vacuum degassing apparatus 200 shown in FIG. 12 to try to make the apparatus larger and to make the degassing throughput larger, there is created a problem in that refractory material bubbles generate into the molten glass from the surface of the refractory material.

When the vacuum degassing vessel 204, the uprising pipe 26 and the downfalling pipe 208 of the vacuum degassing apparatus 200 are constituted by refractory material, this creates problems in that the presence of joints between pieces of refractory material involves deterioration the joints by the molten glass G having a high temperature, and that the lower ends of the uprising pipe 206 and the downfalling pipe 208 are subjected to deterioration at an interface with air as a free surface of the molten glass G since the lower ends are immersed in the upstream and downstream pits 214 and 216. When the vacuum degassing apparatus is constituted by refractory material, the apparatus is heavier as a whole than the vacuum degassing apparatus mainly constituted by platinum because the structure of the refractory material is dense and the used refractory material is mainly electro-cast bricks. It is an extremely difficult and dangerous operation to lift the vacuum degassing vessel 204, the uprising pipe 206, the downfalling pipe 208 and the thermal insulation material 210 in the vacuum housing 202 as a whole as in the conventional vacuum degassing apparatus 200 shown in FIG. 12.

When a vacuum degassing apparatus having a small degassing throughput (quantity of flow) such as the conventional vacuum degassing apparatus is operated in a single use, the range of available quantity of flow is narrow for adjustment in the quantity of flow of the molten glass G in response to required production of glass, creating a problem in that it is difficult to promptly cope with a change in production.

If the platinum or the platinum alloy that forms the vacuum degassing vessel 204, the uprising pipe 206, the downfalling pipe 208 and so on is broken, it takes several months to repair it, creating a problem in that the unavailability of the vacuum degassing apparatus during repairing of it prevents glass products from being produced.

SUMMARY OF THE INVENTION

It is a first object of the present invention to eliminate these problems and to provide a vacuum degassing apparatus for molten glass capable of being built at a low cost, degassing molten glass at a large quantity of flow such as a quantity of flow of 15 ton/day, being used together with a large size of glass melting vessel and a large size of forming treating vessel, and making the size thereof smaller than the glass melting vessel and the forming treating vessel.

It is a second object of the present invention to eliminate these problems, and to provide a vacuum degassing apparatus for molten glass wherein bubbles are removed from molten glass successively supplied, capable of ensuring sufficient durability against the molten glass at a high temperature, remarkably reducing the cost of the apparatus, making the capacity of the apparatus larger, and increasing a vacuum-degassing treatment temperature.

It is a third object of the present invention to eliminate these problems, and to provide a vacuum degassing apparatus for molten glass capable of reducing the construction cost of the apparatus, improving the design freedom of the apparatus to build the apparatus so as to have a large quantity of flow, carrying out the vacuum-degassing treatment at higher temperature, and being fixed as a whole to eliminate the difficult and dangerous operation for lifting the apparatus by constituting the vacuum degassing vessel, the uprising pipe and the downfalling pipe with refractory material which is more inexpensive than noble metal alloy such as platinum.

It is a fourth object of the present invention to eliminate these problems, and to provide a parallel arrangement of vacuum degassing apparatus capable of treating a large quantity of molten glass, promptly coping with a change in production and obtaining molten glass having superior homogeneity.

In order to attain the first object, the inventors have been made tremendous research efforts on refractory material which can be used in place of noble metal material such as platinum alloy in a vacuum degassing apparatus for molten glass. The inventors have provided the present invention based on the following findings.

The inventors have found that when the vacuum degassing vessel is constituted by refractory material instead of noble metal material such as platinum alloy, a vacuum degassing apparatus which can treat a large quantity of flow of molten glass can be built at a lower cost than use of noble metal material irrespectively of the kind of the refractory material, and the bubbles which have generated in a melting furnace can be degassed from the molten glass. The inventors have also found that the area of the surface of the refractory material that contacts with the molten glass becomes relatively larger with respect to the quantity of flow of the molten glass since the volume of the vacuum degassing vessel is limited to a certain size for compactness and good operability, and that when the refractory material is used, some kinds of refractory material is subjected to rapid erosion and the amount of the bubbles that generate from open pores can not be ignored.

The inventors have also found that the bubbles which generates from the pores in the refractory material do not rise in the molten glass having a high viscosity and remain in the molten glass since the bubbles are too small to use a refiner so as to raise the bubbles in the molten glass for degassing, and that the bubbles extremely degrade the quality of glass products since the bubbles originating from the pores have a size enough to be visible in comparison with bubbles generated by a chemical reaction.

The inventors have researched the relationship of the amount of bubbles generating from open pores or generating from the surface of the refractory material in direct contact with the molten glass and the amount of bubbles originating from closed pores in contact with the molten glass due to erosion to the refractory material with respect to the number of bubbles remaining in the molten glass after vacuum-degassing. The inventors have found that the porosity of the refractory material used for the vacuum degassing apparatus can be limited to a certain value or not greater than 5% to minimize, for a long period of time, the total amount of the bubbles originating the surface of the refractory material in directly touch with the molten glass and from the eroded surface, and that even if the bubbles are not completely degassed, the remaining numbers of the bubbles is in the range of an acceptable remaining numbers as glass products, and the refractory is appropriate for the vacuum degassing apparatus. The inventors have also found that such refractory material can be used to degas a large amount of molten glass, and that such refractory material can be provided in a large size of glass melting vessel and a large size of forming treating vessel. Based on these findings, the inventors have attained the present invention.

It is preferable that the refractory material has a porosity of not greater than 3%. It is preferable that the refractory material is electro-cast refractory material or fine burned refractory material. It is preferable that the electro-cast refractory material is at least one of alumina electro-cast refractory material, zirconia electro-cast refractory material and alumina-zirconia-silica electro-cast refractory material. It is preferable that the fine burned refractory material is at least one of alumina fine burned refractory material, zirconia-silica fine burned refractory material and alumina-zirconia-silica fine burned refractory material.

It is preferable that the electro-cast refractory material has at least cortex in direct contact with the molten glass scalped. It is preferable that the cortex of the electric-cast refractory material is scalped by at least 5 mm, and that the apparent porosity of the electric-cast refractory material with the cortex scalped is not greater than 1%.

According to a first mode of the present invention, there is provided a vacuum degassing apparatus for molten glass, comprising a vacuum housing where a vacuum is created; a vacuum degassing vessel housed in the vacuum housing; an introduction device communicated to the vacuum degassing vessel so as to introduce molten glass before degassing into the vacuum degassing vessel; and a discharge device communicated to the vacuum degassing vessel so as to discharge the molten glass after degassing from the vacuum degassing vessel; wherein at least one of the introduction device and the discharge device includes a path to flow a large quantity of flow of the molten glass, and at least a portion of the path that directly contacts with the molten glass is constituted by refractory material having a porosity of not greater than 5%.

According to a second mode of the present invention, there is provided a vacuum degassing apparatus for molten glass, comprising a vacuum housing where a vacuum is created; a vacuum degassing vessel housed in the vacuum housing; an introduction device communicated to the vacuum degassing vessel so as to introduce molten glass before degassing into the vacuum degassing vessel; and a discharge device communicated to the vacuum degassing vessel so as to discharge the molten glass after degassing from the vacuum degassing vessel; wherein the vacuum degassing vessel includes a path to flow a large quantity of flow of the molten glass and a degassing space, and a portion of the path that directly contacts with the molten glass is constituted by refractory material having a porosity of not greater than 5%.

It is preferable that the path of the vacuum degassing vessel has a rectangular section.

It is preferable that the each of introduction device and the discharge device comprises an uprising pipe and a downfalling pipe, and that at least one of the uprising pipe and the downfalling pipe is constituted by refractory material having a porosity of not greater than 5%. It is also preferable that at least one of the uprising pipe and the downfalling pipe has a path with a rectangular section. It is also preferable that at least one of the uprising pipe and the downfalling pipe as well as the vacuum degassing vessel is housed in the vacuum housing.

It is preferable that the flow rate of the molten glass in the path of the vacuum degassing vessel is not less than 15 ton/day.

The flow rate of the molten glass in the path of the vacuum degassing vessel can be increased to not less than 30 ton/day by providing a cooling device for cooling the molten glass.

According to a third mode of the present invention to attain the second object, the introduction device includes an uprising pipe and an extending pipe communicated to a lower end of the uprising pipe, and the discharge device includes a downfalling pipe and an extending pipe communicated to a lower end of the downfalling pipe, wherein at least portions of the uprising pipe and the downfalling pipe that directly contact with the molten glass are constituted by refractory material having a porosity of not greater than 5%, and the extending pipes of the uprising pipe and the downfalling pipe are made of platinum or platinum alloy in the vacuum degassing apparatus for molten glass according to the second aspect.

It is preferable that at least one of the extending pipes has an upper end provided with a flange, and the extending pipe is fixed to the uprising pipe or the downfalling pipe by inserting and sandwiching the flange in a joint in the furnace lining.

In order to attain the third object, the inventors have made tremendous research efforts to provide the apparatus with a larger capacity and a greater amount of flow. The tolerance of fine bubbles less than a certain size is not severer for glass products in mass production such as glass for construction or automobiles than glass for optical use or electronic use. In the case of glass for construction or automobiles, the presence of fine bubbles having a longer diameter of not greater than 0.3 mm is acceptable. The inventors have found that most of the bubbles originating from electro-cast refractory material have a diameter of not greater than 0.2 mm and bubbles having a diameter greater than 0.2 mm do not originate from electro-cast refractory material with lapse of time, and that such electro-cast refractory material instead of noble metal alloy can be used in a portion of a path for a molten glass that directly contacts with the molten glass.

The inventors have also found that if the vacuum degassing vessel, the uprising pipe and the downfalling pipe are constituted by more inexpensive electro-cast refractory material than noble metal alloy and if the molten glass can be continuously vacuum-degassed as in the case of noble metal alloy, there is no need to limit the material use in terms of cost and to restrict the size in terms of a reduce in strength caused by the limited material use in comparison with case using noble metal alloy such as platinum, design freedom can be remarkably improved to be capable of building the vacuum degassing apparatus so as to have a large amount of flow, and vacuum-degassing at a higher temperature becomes possible.

The inventors have attained the present invention based on the findings stated above.

According to a fourth mode of the present invention, the introduction device includes an uprising pipe and an upstream connecting passage for communicating between the uprising pipe and a melting vessel with a free surface of the molten glass therein or an upstream open channel with a free surface of the molten glass therein; the discharge device includes a downfalling pipe and a downstream connecting passage for communicating between the downfalling pipe and a downstream open channel with a free surface of the molten glass therein or a treating vessel with a free surface of the molten glass therein; the upstream connecting passage, the uprising pipe, the vacuum degassing vessel, the downfalling pipe and the downstream connecting passage form continuous closed passages; and portions of the continuous closed passages that directly contact with the molten glass are constituted by refractory material having a porosity of not greater than 5% in the vacuum degassing apparatus according to the second mode.

It is preferable that the vacuum housing comprises a metallic casing which encloses the vacuum degassing vessel, and portions of the uprising pipe, the downfalling pipe and the upstream and downstream connecting passages, and a space between the vacuum degassing vessel and the vacuum housing and spaces between the portions of the uprising pipe, the downfalling pipe and the upstream and downstream connecting passages and the vacuum housing have a multi-layered structure in section which is filled with thermal insulation material made of firebricks.

It is preferable that the vacuum degassing vessel has a pressure of $\frac{1}{20}$–$\frac{1}{3}$ atmosphere therein, and the molten glass that has a viscosity of not greater than $10^{4.5}$ poise flows at a current of not greater than 50 mm/sec in the vacuum degassing vessel.

According to a fifth mode of the present invention to attain the fourth object, there is provided a parallel arrangement of vacuum degassing apparatus comprising a plurality of vacuum degassing units for vacuum-degassing molten glass supplied from a melting vessel; and a merging unit for merging the molten glass supplied from the vacuum degassing units, stirring the merged molten glass and supplying the stirred molten glass to a downstream side; wherein each of the vacuum degassing units includes a vacuum housing where a vacuum is created, a vacuum degassing vessel housed in the vacuum housing to vacuum-degas the molten glass, an introduction device communicated to the vacuum degassing vessel so as to introduce the molten glass before degassing into the vacuum degassing vessel; and a discharge device communicated to the vacuum degassing vessel so as to discharge the molten glass after degassing from the vacuum degassing vessel into the merging unit; and wherein a pressure-equalizing pipe is provided to communicate between the vacuum degassing units.

It is preferable that the introduction device comprises an uprising pipe to rise the molten glass before degassing so as to introduce the molten glass into the vacuum degassing vessel, and the discharging device comprises a downfalling pipe to downwardly withdraw the molten glass after degassing from the vacuum degassing vessel so as to lead out the molten glass into the merging unit.

It is preferable that the merging unit includes a plurality of reservoirs, each of the reservoirs communicated to each of the introduction devices, a merging vessel communicated to the reservoirs through throats, and a stirring vessel communicated to a downstream side of the merging unit.

It is preferable that the pressure-equalizing pipe is provided with a cock to shut communication between the vacuum degassing vessels.

It is preferable that the molten glass is soda-lime glass.

It is preferable that the introduction device, the vacuum degassing vessel and the discharging device have at least a main portion thereof in direct contact with the molten glass constituted by refractory material having a porosity of not greater than 5%.

It is preferable that the porous of the refractory material is not greater than 3% in the first through fifth modes.

It is preferable that the refractory material is electro-cast refractory material or fine burned refractory material. It is preferable that the electro-cast refractory material is at least one of alumina electro-cast refractory material, zirconia electro-cast refractory material and alumina-zirconia-silica electro-cast refractory material. It is preferable that the fine burned refractory material is at least one of alumina fine burned refractory material, zirconia-silica fine burned refractory material and alumina-zirconia-silica fine burned refractory material.

It is preferable that the electro-cast refractory material has at least a cortex in direct contact with the molten glass scalped.

It is preferable that the cortex of the electro-cast refractory material is scalped by at least 5 mm, and that the apparent porosity of the electro-cast refractory material with the cortex scalped by at least 5 mm is not greater than 1%.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Now, the vacuum degassing apparatus for molten glass according to the present invention will be described in detail in reference to appropriate embodiments shown in the accompanying drawings.

First, the vacuum degassing apparatus for molten glass according to the second mode of the present invention will be explained in detail in reference to the drawings.

Figure 1:
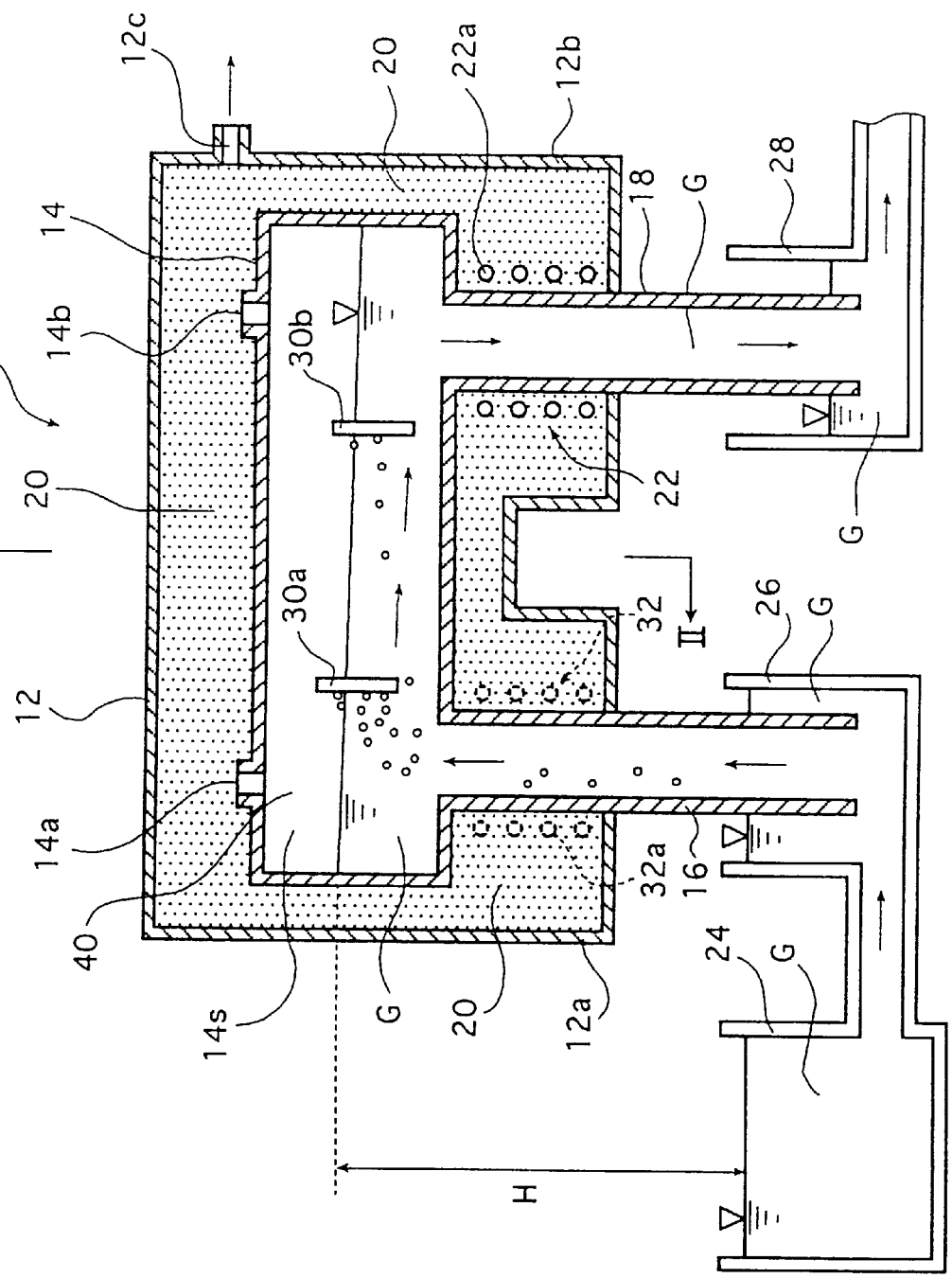
FIG. 1 is a schematic vertical sectional view of the vacuum degassing apparatus for molten glass according to an embodiment of the present invention.
Figure 3:
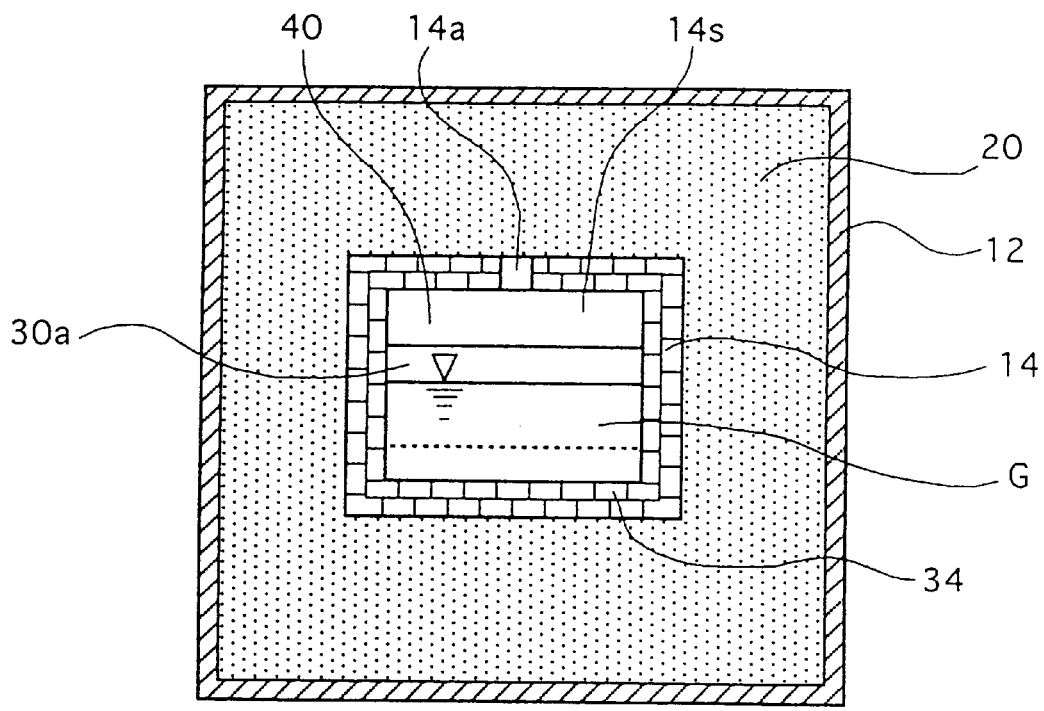
FIG. 3 is a sectional view taken along the line II—II of FIG. 1.

In FIG. 1 is show n a schematic vertical sectional view of the vacuum degassing apparatus for molten glass according to an embodiment of the second aspect. In FIG. 3 is shown a vertical sectional view of a vacuum degassing vessel in the apparatus shown in FIG. 1 and taken along the line II—II of FIG. 1.

The vacuum degassing apparatus 10 for molten glass according to the second aspect is used in a process wherein molten glass C in a melting vessel 24 is vacuum-degassed, and the vacuum-degassed molten glass is continuously supplied to a successive treating vessel (not shown), e.g. a forming treating vessel for plate glass such as a floating bath and a forming operating vessel for bottle. As shown in these figures, the apparatus includes a vacuum housing 12 formed in a rectangular arched shape or an inverse U letter shape and made of stainless steel, a vacuum degassing vessel 14 horizontally housed in the vacuum housing 12, and an uprising pipe 16 and a downfalling pipe 18 which are vertically arranged in the vacuum housing 12 and have upper ends thereof mounted to right and left ends of the vacuum degassing vessel 14. In the vacuum degassing apparatus 10 shown, a space between the vacuum degassing vessel 14 and the vacuum housing 12 and spaces between the uprising and downfalling pipes 16 and 18 and the vacuum housing 12 are filled with thermal insulation material 20 to cover the circumference of each of the vacuum degassing vessel and the uprising pipe 16 and 18 in a thermal insulation way. In the vacuum degassing apparatus 10 shown, the downfalling pipe 18 in the vacuum housing 12 has an upper portion provided with a cooling pipe 22 as a cooling device around a circumference thereof.

In the example shown, the uprising pipe 16 has an upper portion housed in a leg 12a of the vacuum housing 12. The uprising pipe 16 has a lower portion projected from the leg 12a of the vacuum housing 12 and fitted into an open end of an upstream pit 26 so as to be immersed in the molten glass G in the upstream pit 26. The upstream pit 26 communicates with the melting vessel 24. On the other hand, the downfalling pipe 18 has an upper portion housed in a leg 12b of the vacuum housing 12. The downfalling pipe 18 has a lower portion extended from the leg 12b of the vacuum housing 12 and fitted into an open end of a downstream pit 28 so as to be immersed in the molten glass G in the downstream pit 28. The downstream pit 28 communicates with a successive treating vessel not shown.

In the example shown, the vacuum housing 12 is made of stainless steel and has the rectangular arched shape with both legs 12a and 12b. The vacuum housing houses the vacuum degassing vessel 14, the uprising pipe 16 and the downfalling pipe 18, and works as a pressure vessel to maintain particularly the inside of the vacuum degassing vessel 14 under certain depressurizing conditions (stated later). The vacuum housing is provided with a suction port 12C at an upper right portion (refer to FIG. 1) to depressurize the inside thereof. The suction port 12C of the vacuum housing 12 is connected to a vacuum pump (not shown) for instance. There are no limitations on the shape and the material of the vacuum housing 12 as long as the shape or the material does not prevents the vacuum housing from performing proper functions. The vacuum housing is preferably made of metal, in particular stainless steel or heat resisting steel.

The vacuum degassing vessel 14 communicates with an upper end of the uprising pipe 16 at a lower right portion thereof (refer to FIG. 1), communicates with an upper end of the downfalling pipe 18 at a lower right portion thereof (refer to FIG. 1), and is provided with suction ports 14a and 14b at a upper left portion and at an upper right portion thereof (refer to FIG. 1) to maintain the inside of the vacuum degassing vessel 14 under a certain depressurizing state (set depressurizing conditions). In the vacuum degassing vessel 14, the molten glass G introduced from the uprising pipe 16 flows toward in a right direction in FIG. 1, and is led out of the vacuum degassing vessel 14, which has an upper space 14s included therein to break rising bubbles in the molten glass G. In the vacuum degassing vessel 14, there are provided barriers 30a and 30b which have portions thereof immersed in the molten glass G and the remaining portions thereof projected into the upper space 14s in order to block the rising bubbles in the molten glass G, promotes breakage and decrease or avoid the outflow of the bubbles in the downstream direction.

The depressurizing state for the inside of the vacuum degassing vessel 14 is set to a pressure of $\frac{1}{20}$–$\frac{1}{3}$ atmosphere depending on conditions such as the viscosity (temperature) of the molten glass G for instance. The level difference H between the molten glass G in the melting vessel 24 and the molten glass G in the vacuum degassing vessel 14 is set to such a level difference depending on the set depressurizing state so that the molten glass G is prevented from having a surface swollen with a layer of the rising bubbles like boiling water and that the layer of the rising bubbles is prevented from contacting a top inner surface or an inspection window of the vacuum degassing vessel to make the glass material is the layer adhere these portions and consequently make the adhered glass material mixed in the molten glass, contributing to generation of defective products. When the pressure in the vacuum degassing vessel 14 is set at a pressure of $\frac{1}{20}$–$\frac{1}{3}$ atmosphere, the level difference H between the molten glass G in the melting vessel 24 and that in the vacuum degassing vessel 14 is required to be about 2.5–3.5 m.

As shown in FIG. 3, the vacuum degassing vessel 14 has a path formed therein so as to have a sectional shape of certain dimensions, preferably a rectangular sectional shape. The vacuum vessel is constituted by refractory material 34 which forms a certain length of shell, preferably a rectangular shell, and which is preferably fine refractory material having a high bulk density and a porosity of not greater than 5%, preferably not greater than 3%. In the present invention, the sectional shape of the path 40 in the vacuum degassing vessel 14 is not restricted. The sectional shape may take any shapes such as a rectangular one shown in FIG. 3, a circular one, an elliptical one and a polygonal one. It is preferable that the sectional shape takes a rectangular one as shown in FIG. 3. The following explanation will be made, taking a rectangular sectional shape as a typical example.

The porosity is a rate of the volume of pores included in refractory material to the total volume of the refractory material, and represented by (1-Bulk Specific Gravity/True Specific Gravity)×100(%). A larger volume of the pores in the refractory material has a higher porosity, and a smaller volume of the pores in the refractory material has a smaller porosity. The pores include open pores and closed pores, and are empty spaces having a size of not greater than 10 mm. Empty spaces which has a size of greater than 10 mm such as voids in electro-cast refractory material are not included in the pores. The voids are empty spaces that are produced by volume shrinkage at the time of casting electro-cast refractory material.

The vacuum degassing apparatus according to the first mode of the present invention is basically different from the apparatus according to the second mode in that a portion of a path 40 in the vacuum degassing apparatus 14 that directly contacts with the molten glass is made of platinum alloy, and at least one of the uprising pipe and the downfalling pipe has a portion thereof in direct contact with the molten glass constituted by refractory material having a porosity of not greater than 5%.

Now, the refractory material which is appropriately used in a portion of the molten glass path in direct contact with the molten glass will be described.

The refractory material used in the present invention is refractory material having a porosity of not greater than 5%. The reason why refractory material having a porosity of not greater than 5% is used is that the number of bubbles in the molten glass which originate from the gas in the pores in the refractory material can be maintained in an acceptable range even if such refractory material is used in a portion of the path such as the vacuum degassing vessel in direct contact with the molten glass, and that erosion resistance is superior and the life of the path or the life of the vacuum degassing apparatus meet the requirements.

Next, the reason why the porosity of the refractory material which is used in accordance with the present invention is limited to not greater than 5% will be described in detail.

Among bubbles mixing in the molten glass, bubbles originating pores include ones originating from the open pores and ones originating from the closed pores as stated earlier. Most of the bubbles originating from the open pores generate on an initial stage of the vacuum degassing treatment, and the generation of the bubbles reduces as the vacuum degassing operation continues. On the other hand, the generation of the bubbles originating from the closed pores gradually increases during the vacuum degassing treatment. As state earlier, there is raised a problem in that unless the bubbles originating from the closed pores are degassed from the molten glass, definite trouble is likely to be invited since the bubbles originating from the closed pores have a greater diameter than bubbles generated by a chemical reaction.

In the case of a degassing refining treatment with a normal refiner used, the amount of bubbles per se is not a problem since molten glass has such a low viscosity at a high temperature to remove and degas the bubbles easily and since erosion is extremely minimized at a low temperature. For these reasons, it has been thought that the amount of bubbles is no problem even in a vacuum degassing treatment wherein the temperature of molten glass to be dealt with is low.

However, as stated earlier, there have been a problem in that the bubbles that originate from the closed pore and generate during the treatment can not be ignored in the vacuum degassing treatment because the load to the refractory material is 10 times the normal degassing refining treatment because of required reduction in the volume of the vacuum degassing vessel.

When refractory material is used in the path of the vacuum degassing vessel 14 where the bubbles in the molten glass G are degassed by depressurization, the refractory material in direct contact with the molten glass G is exposed under depressurization, the gas in the pores included in the refractory material is sucked into the vacuum degassing vessel 14, and the gas is released into the molten glass G from the refractory material, generating fine bubbles with a size of about 0.1–0.2 mm in the molten glass G. The bubbles which has generated in the molten glass G by being released from the pores in the refractory material due to depressurization include bubbles that rise in the molten glass having a high viscosity and remain in the molten glass G without being sucked out of the vacuum degassing vessel.

The bubbles which generate in the molten glass G before vacuum-degassing include components of carbon dioxide ($CO_2$) gas, sulfur dioxide ($SO_2$) gas and nitrogen ($N_2$) gas caused from sal soda used as raw material for melting glass, and sodium sulfate and sodium nitrate used as a refiner. Most of the bubbles originating from these gases are removed by the vacuum degassing treatment. The bubbles that remain in the molten glass G are dominantly occupied by the bubbles that originate from the refractory material of the vacuum degassing vessel 14. For this reason, it is necessary to restrain bubbles from causing from the pores in the refractory material.

The refractory material is eroded as the molten glass passes through the refractory material. As the erosion develops, many of the closed pores are acceleratedly exposed to generate the bubbles. From this viewpoint, the erosion resistance of the refractory material or the erosion speed by the molten glass becomes a problem. It has been found that the erosion resistance (erosion speed) is also dependent on a porosity with respect to the refractory material used in the present invention.

Figure 2:
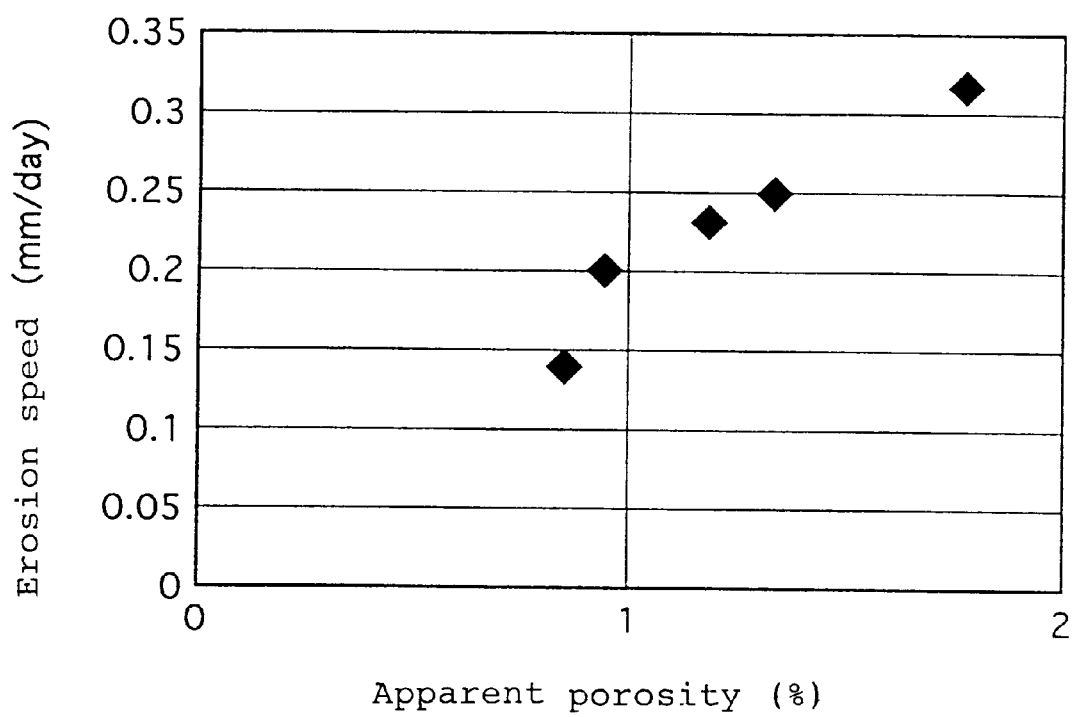
FIG. 2 is a graph to explain the relationship between apparent porosities of refractory material and erosion speeds of the refractory material by molten glass.

In FIG. 2 is shown the relationship between apparent porosities of alumina-zirconia-silica electro-cast refractory material and erosion speeds of the refractory material by molten glass. The apparent porosities are porosities of open pores in the refractory material. The erosion speeds were found by measuring an amount of erosion of refractory material after having flowed the molten glass for a certain period of time. The composition of the used alumina-zirconia-silica electro-cast refractory material was 40% of zirconia ($ZrO_2$), 11.5% of silica ($SiO_2$), 47% of alumina ($Al_2O_3$), 1.1% of sodium hydroxide ($Na_2O$) and 0.4% of the balance. The used glass was soda-lime silica glass, and the erosion temperature was 1300° C.

As shown in FIG. 2, the apparent porosities and the erosion speeds of the refractory material has a linear relationship, which can be approximately represented as a linear equation.

Provided that the contact area of the vacuum degassing vessel with the molten glass is 50 m$^2$ and the quantity of flow (degassing throughput) of the molten glass is 100 ton/day, the relationship shown in FIG. 2 shows that the erosion speed at the apparent porosity of 0.5% (the porosity of 1.5%) is 0.1 mm/day, and that the erosion speed at the apparent porosity of 1% (the porosity of 2.5%) is 0.2 mm/day. By extrapolation according to the relationship shown in FIG. 2, it is found that the erosion speed at the apparent porosity of 3% (the porosity of 5%) is 0.6 mm/day, and that the erosion speed at the apparent porosity of 5% is 1.0 mm/day.

Calculating a porous amount from the erosion speed of 0.1 mm/day at the apparent porosity of 0.5% (the porosity of 1.5%), 75 cm/day (=0.01 cm/day×50×10$^4$ cm$^2$×0.015) is formed. Converting the porous amount into the number of bubbles having a diameter of 0.5 mm, 1.1×10$^6$ bubbles/day (=75 cm$^3$/day/((4/3)×3.14×0.025 cm$^3$)) is formed. The number of the bubbles per 1 kg of glass is about 11 (=1.1×10$^6$ bubbles/day/10$^5$ kg/day).

The calculation results for the apparent porosities of 1% and 3% which were likewise found are listed in Table 1 together with those for the apparent porosity of 0.5%.

TABLE 1

| Apparent porosity (%) | Porosity (%) | Erosion speed (mm/day) | Number of bubbles (number/kg) |
| --- | --- | --- | --- |
| 0.5 | 1.5 | 0.1 | 11 |
| 1 | 2.5 | 0.2 | 38 |
| 3 | 5 | 0.6 | 230 |
| 5 | 8 | 1.0 | 611 |

Table 1 shows that, in the case of the alumina-zirconia-silica electro-cast refractory material, the number per 1 kg of glass is about 230 at the apparent porosity of 3% (the porosity of 5%). This figure is at the very limit of the acceptable range for bottle glass and so on.

In order to use refractory material to put a stable vacuum degassing treatment of molten glass into practice, it is required that refractory material of having a porosity of not greater than 5%, preferably 3%, be used at least in the vacuum degassing vessel, and that such refractory material is also preferably used in the downfalling pipe and further preferably in the uprising pipe as well.

As explained, when refractory material having a porosity of not greater than 5.0% is used in the path, the vacuum degassing treatment of molten glass is sufficiently carried out, and a decrease in the erosion speed can meet the required life for the vacuum degassing vessel 14.

In the case of glass for optical application or electronic application wherein the required quality of glass is high and the acceptable number of bubbles is required to be a small value, use of refractory material having a porosity of not greater than preferably 3%, more preferably 0.5% can not only restrain the number of bubbles in the acceptable range but also restrain the refractory material from eroded so as to maintain the required life of the vacuum degassing vessel 14. It is preferable that refractory material having different porosities is selectively used for the path, depending on the usage of glass product.

The refractory material which is appropriately used at a portion of the molten glass path in direct contact with the molten glass in the present invention is refractory material having a porosity of not greater than 5%, preferably 3%. Any kind of such refractory material is acceptable as long as elution of the refractory material into the molten glass G does not degrade the quality due to coloration or heterogeneity for instance, and preferably the reaction to the molten glass G is small and the refractory material per se is difficult to be eroded by the molten glass. An example of such refractory material is fine refractory material such as electro-cast refractory material having a porosity of not greater than 5% and burned refractory material having a porosity of not greater than 5%. The electro-cast refractory material preferably has a porosity of not greater than 3%, and the burned refractory material preferably has a porosity of not greater than 3%.

The electro-cast refractory material is one that is prepared by being cast into a certain shape after refractory material has been electrically molten. The burned refractory material is one that is subjected to a thermal treatment at a certain temperature to obtain a certain property such as strength after refractory material has been shaped.

Any kind of electro-cast refractory material is acceptable as long as the electro-cast refractory material has a porosity of not greater than 5%. It is preferable that the electro-cast refractory material is fine electro-cast refractory material which has a high bulk density with a porosity of not greater than 3% and can maintain a vacuum in the vacuum degassing vessel 14. Examples of such electro-cast refractory material are zirconia electro-cast refractory material, alumina electro-cast refractory material, alumina-zirconia-silica (AZS; $Al_2O_3$—$ZrO_2$—$SiO_2$) electro-cast refractory material, specifically, ZB-X950, MARSNITE (MB-G), ZIRCONITE (ZB) manufactured by Asahi Glass Company Ltd.

The fine burned refractory material in the present invention has a porosity of not greater than 5% while normal burned refractory material has a porosity of about 20%. Any kind of fine burned refractory material is acceptable in the present invention as long as it is fine burned refractory material that has a porosity of not greater than 5%, preferably a high bulk density with a porosity of not greater than 3%, and can maintain a vacuum in the vacuum degassing vessel 14. Examples of such fine burned refractory material are fine zirconia-silica burned refractory material, fine alumina burned refractory material and fine alumina-zirconia-silica burned refractory material.

Since α,β-alumina electro-cast refractory material has a porosity of not greater than 5%, this refractory material can be used in the present invention.

When the electro-cast refractory material is used in the path of the vacuum degassing vessel 14, it is preferable that the refractory material has a cortex thereof scalped by preferably not lower than 5 mm in advance is used as the refractory material. The electro-cast refractory material has the tendency to have many pores formed in the surface of the refractory material by involving atmospheric air on casting in the forming step and to have almost no pores formed inside the refractory material deeper than 5 mm, where the porosity is not greater than 1%.

In Table 2 are shown apparent porosities in a cortex of 0–6 mm in depth and in a cortex of 6–20 mm in depth of alumina-zirconia-silica electro-cast refractory material, which were obtained by picking the cortexes at 5 sites in one piece of the refractory material (sampling sites A–E). Table 2 shows that the sampling site B and the sampling site C have apparent porosities of not less than 1.0% in the cortex of 0–6 mm in depth, and that all of the sampling sites A–E have apparent porosities of not greater than 1.0% in the cortex of 6–20 mm in depth. The cortex of 6–20 mm in depth at the five sites has an average porosity of 0.81% and a deviation of 0.07%, and the cortex of 0–6 mm in depth has an average porosity of 0.87% and a deviation of 0.34%. This means that the cortex of 0–6 mm in depth can be scalped to remove localized variations in the porosities in the cortex, making the porosity in the cortex almost equal to the porosity in an inner portion of the refractory material.

TABLE 2

| Sampling site | Apparent porosities (%) in cortex of 0–6 mm in depth (%) | Apparent porosities (%) in the cortex of 6–20 mm in depth |
| --- | --- | --- |
| A | 0.67 | 0.84 |
| B | 1.0 | 0.75 |
| C | 1.37 | 0.89 |
| D | 0.84 | 0.85 |
| E | 0.46 | 0.72 |

The cortex of the refractory material can be scalped to restrain the bubble forming phenomenon that occurs on an initial stage when the molten glass G directly contacts with the refractory material, smoothly carrying out the degassing treatment for the molten glass G from the initial stage of the operation of the vacuum degassing apparatus 10.

Scalping can be carried out by a known grinder or diamond grinder.

Scalping is required only to electro-cast refractory material. The porosity in a cortex of burned refractory material is not higher than that in an inner portion of the burned refractory material unlike electro-cast refractory material.

The method to use such refractory material having a porosity of not greater than 5% to form the vacuum degassing vessel so as to have a certain sectional shape such as a rectangular sectional shape and a certain length is not restrictive. For example, small pieces of rectangular parallelepiped electro-cast refractory material may be three-dimensionally put on another in staggered fashion or in a labyrinth structure, and bond is filled in joints between the pieces of refractory material to obtain a certain length of shell such as a rectangular shell. For example, short pieces of electro-cast refractory material in a shell shape such as a rectangular shell shape may be piled in a single column, and bond may be filled in joints between the short pieces to obtain a certain length of shell such as a certain length of rectangular shell.

Figure 12:
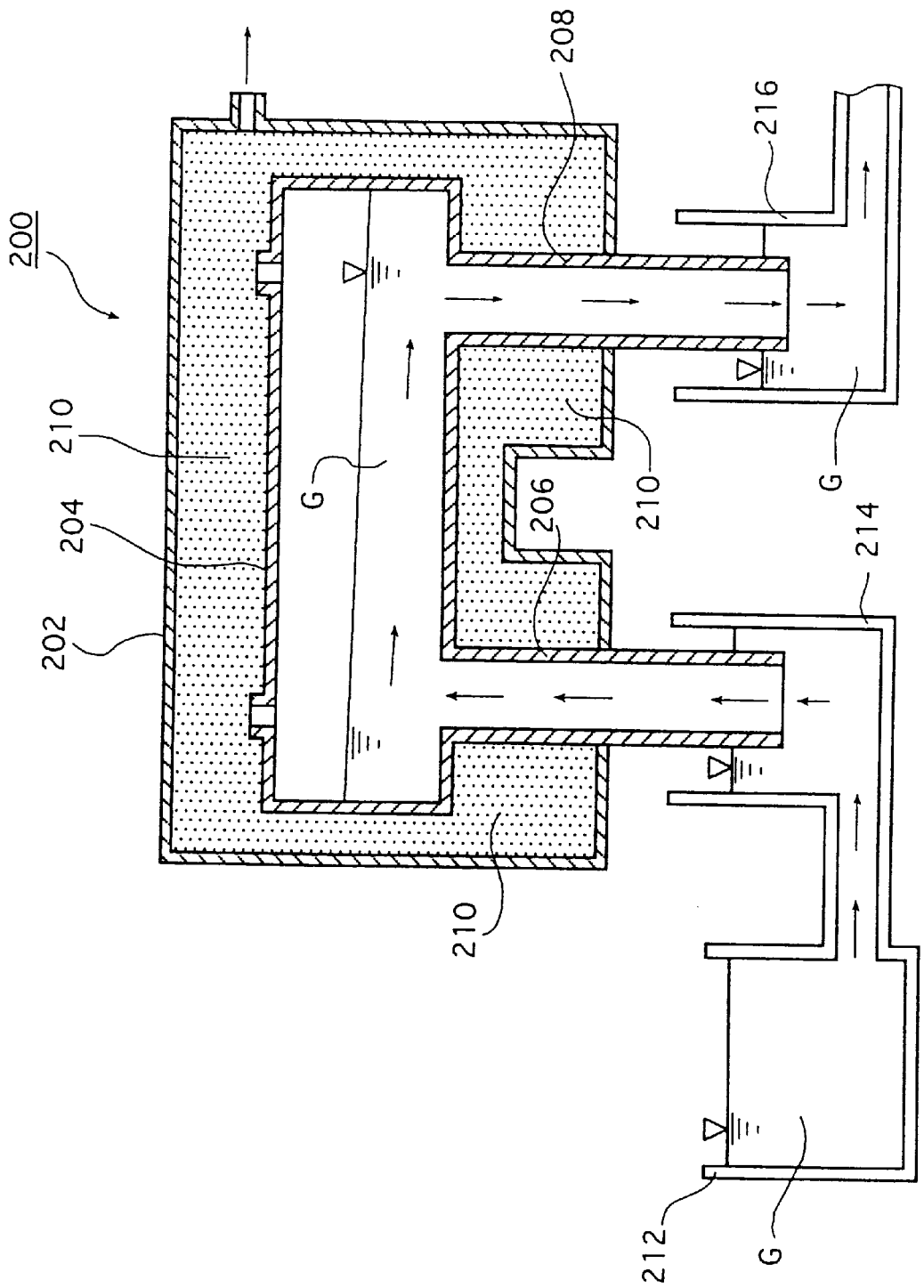
FIG. 12 is a schematic vertical sectional view of a conventional vacuum degassing apparatus.

As stated earlier, the conventional vacuum degassing apparatus 200 as shown in FIG. 12 has used a circular shell made in noble metal such as platinum alloy at portions in contact with the molten glass G because of a low reactivity at high temperatures and sufficient strength at high temperatures. The use of noble metal has restricted the temperature of the molten glass at an inlet of the apparatus to not greater than a certain value (e.g. 1400° C.), and has been unable to make the diameter of the degassing vessel 204 larger than a certain value in terms of cost and sufficient strength at high temperatures, preventing the quantity of flow of the molten glass G, consequently the degassing throughput of the molten glass from increasing. The use of noble metal in the conventional apparatus has restricted the temperature of the molten glass G at the inlet of the apparatus, has been enable to increase the quantity of flow and has required heating to compensate cooling in the apparatus so as to keep the temperature at an outlet of the apparatus constant. This means that use of metal that can be self-heated has been required, that is to say use of noble metal has been required.

Figure 4:
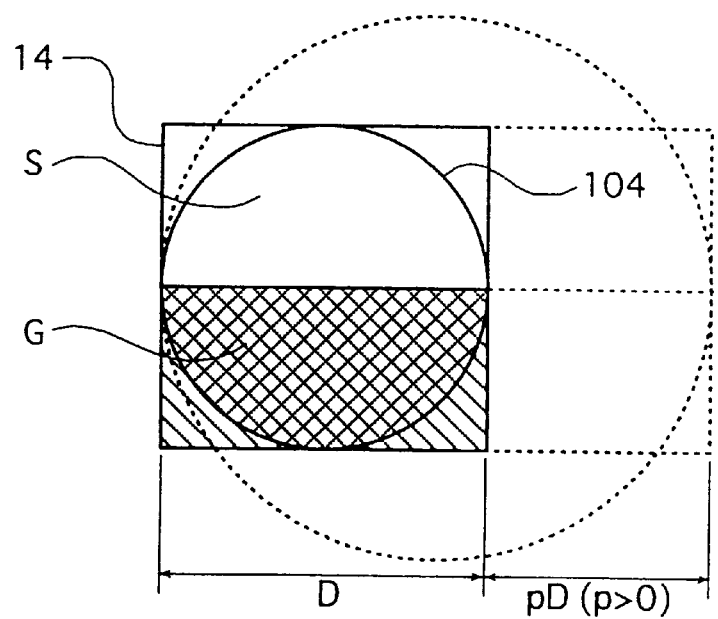
FIG. 4 is a schematic view to explain the relationship between a vacuum degassing vessel according to the present invention and a conventional vacuum degassing vessel in terms of a vertical sectional shape and flow rate.

On the other hand, in accordance with the present invention, at least the vacuum degassing vessel 14 can be built from the refractory material according to the present invention to eliminate the necessity of adoption of a circular form and preferably to be formed in a rectangular shell, not only increasing the quantity of flow as shown in FIG. 3 but also eliminating the limitations on the size of the rectangular shell to further increase the quantity of flow. Comparisons between a quantity of flow Qc which is obtained when the vacuum degassing vessel 104 of the conventional vacuum degassing-apparatus 100 is constituted by a circular shell having a diameter D as shown in FIG. 4 and a quantity of flow Q which is obtained when the vacuum degassing vessel 14 of the vacuum degassing apparatus 10 according to the present invention is formed in a rectangular (square) shape having a width D and a height D as shown in FIG. 4 indicate that the present invention with the rectangular shell used can increase the quantity of flow Q by 1.27 times with the same size or the same pressure loss maintained in comparison with the conventional one with the circular shell used since the following equation is found provided that the area of the upper space S for breaking the bubbles is half of the section area of the shell.

$$Q/Qc = (D^2/2)/\{\pi(D/2)^2/2\} = 4/\pi = 1.27$$

When such a rectangular shell as in the shown Example is used and when the width is extended from d to (1+p)D (p>0) without changing the height D, the quantity of flow can be easily increased by $(1+p)^2$, which means that the quantity of flow is increased by $1.27(1+p)^2$ in comparison with the conventional apparatus with a circular shell used When a circular shell is used, and when the depth of the path for the molten glass G in a circular section is greater than one half of the diameter thereof, it is impossible to ensure a sufficient bubble breaking space since the upper space S and the width thereof remarkably decrease. When a rectangular shell is used, and when the depth of the path for the molten glass G in a rectangular section is greater than one half of the height thereof, it is possible to ensure a suitable space depending on a bubble breaking amount since the width of the upper space S remains unchanged. The use of a rectangular shell can set an appropriate depth to further increase the quantity of flow. Even if the size of a circular shell is extended to increase the quantity of flow in the conventional apparatus, a ratio of an increase in the quantity of flow to an increase in the size is smaller than that in the case of the shown example with a rectangular shell used.

The length L of the vacuum degassing vessel 14 which has a certain sectional shape such as a rectangular sectional shape in accordance with the present invention is not restrictive. The length is set, depending on the depth, the kind, the viscosity (temperature), the quantity of flow (throughput) and the current of the molten glass G in the vacuum degassing vessel 14, so that the molten glass G can stay in the vacuum degassing vessel 14 only for a time required for the bubbles in the molten glass G to rise, be broken and be removed in a sufficient way, that is to say a time required for the molten glass to be sufficiently degassed can be obtained.

The uprising pipe 16 and the downfalling pipe 18 are used to maintain the level difference H between the molten glass G in the vacuum degassing vessel 14 and the molten glass G in the melting vessel 24. The uprising pipe 16 brings up the molten glass G before degassing from the melting vessel 24 into the vacuum degassing vessel 14 through the upstream pit 26 by use of depressurization. The downfalling pipe 18 downwardly leads out the molten glass G after degassing from the vacuum degassing vessel 14, and forwards the molten glass to a successive treating vessel (not shown) through the downstream pit 28.

Although the uprising pipe 16 and the downfalling pipe 18 may be constituted by noble metal such as platinum alloy as in the conventional apparatus, it is preferable that both of the pipes, in particular the uprising pipe 16, is made of refractory material having a porosity of not greater than 5% as in the vacuum degassing vessel 14 in terms of the throughput and the introduction (inlet) temperature of the molten glass G. For example, a circular shell made of refractory material having a porosity of not greater than 5% or a rectangular shell made of refractory material having a porosity of not greater than 5% can be used. It is further preferable that both pipes are constituted by a rectangular shell made of refractory material having a porosity of not greater than 5% just as in the vacuum degassing vessel 14. The dimensions of the uprising pipe 16 and the downfalling pipe 18 may be appropriately selected, depending on the quantity of flow of the molten glass G in the vacuum degassing vessel 14, or the degassing throughput in the vacuum degassing apparatus 10.

In accordance with the present invention, the vacuum degassing vessel 14 can be constituted by a shell made of refractory material having a certain sectional shape and a porosity of not greater than 5%, such as a rectangular shell made of refractory material having a rectangular section and a porosity of not greater than 5%, to increase the quantity of flow of the molten glass G in the vacuum degassing vessel 14, and consequently to increase the degassing throughput in the vacuum degassing apparatus. When the degassing throughput increases, that is to say when the quantity of the molten glass G which flows into the uprising pipe 16 increases, the sensible heat carried by the molten glass G into the vacuum degassing apparatus 10 necessarily increases. The present invention can eliminate heating the vacuum degassing vessel 14 and so on by a heating device, in particular self-heating, which has been required to maintain the outlet temperature of the vacuum degassing apparatus 10 at a certain value in the conventional apparatus because of the limitation in the quantity of flow. In accordance with the present invention, the inlet (introduction) temperature of the molten glass G in the vacuum degassing apparatus 10, that is to say the outlet temperature of the melting vessel 24, can be raised since at least the vacuum degassing vessel 14 is not required to be made of noble metal such as platinum alloy. By increasing the outlet temperature of the melting vessel, the sensible heat carried by the molten glass G into the vacuum degassing apparatus 10 is further increased, eliminating heating the vacuum degassing vessel 14 and so on by the heating device.

In the present invention, it is preferable that the degassing throughput, that is the quantity of the flow of the molten glass G in the vacuum degassing vessel 14 (in the path having a rectangular section therein) is 15 ton/day, more preferably 20 ton/day, eliminates heating the molten glass G during degassing, and consequently eliminating the heating device. The reason why the degassing throughput in the absence of the heating device is limited to not less than 15 ton/day is that an influx quantity of glass smaller than that value can not maintain the temperature in the entire vacuum degassing apparatus having a minimum size in a desirable temperature range.

If the degassing throughput is increased, the outlet temperature of the vacuum degassing apparatus 10, consequently the inlet temperature of a successive treating vessel in particular a forming treating vessel, is raised beyond a certain temperature in some cases since the sensible heat carried by the molten glass G into the vacuum degassing apparatus 10 is also increased. In such cases, the molten glass G has to be cooled inside or outside the vacuum degassing apparatus 10 so that the inlet temperature of the forming treating vessel as the successive treating vessel is at a certain temperature. For this reason, if the degassing throughput or the quantity of flow the molten glass G is not less than 30 ton/day in particular 35 ton/day, the vacuum degassing apparatus 10 according to the present invention preferably has a cooling device provided therein. The reason why the degassing throughput is limited to not less than 30 ton/day in the presence of the cooling device is that if the size of the vacuum degassing apparatus is significantly made small in terms of cost and difficulty in construction, a larger influx quantity of glass material rises the temperature too much to enlarge the erosion in the refractory material or prevent the temperature in the vacuum degassing apparatus from being lowered to a value appropriate to forming.

In the present invention, it is preferable that the viscosity of the molten glass G, that is to say the temperature of the molten glass is high for degassing in the vacuum degassing vessel 14. As a result, it is preferable that the cooling device 22 is provided on an outlet side of the vacuum degassing vessel 14 or the downfalling pipe 18 such as an outer circumference of an upper portion of the downfalling pipe 18 as in the shown vacuum degassing apparatus 10. In the present invention, the cooling device 22 may be provided in the entire vacuum degassing vessel 14, on an inlet side of the vacuum degassing vessel, at a part of other portions or at an uprising pipe 16, and the cooling device 22 may be provided two of or all of the uprising pipe 16, the vacuum degassing vessel 14 and the downfalling pipe 18. The cooling device 22 according to the present invention may be constituted by winding a cooling pipe 22a using water and so on as a refrigerant as in the shown example. The position, the direction, the distance and the size of the cooling pipe 22a may be appropriately set as required. Liquid other than water, or gas may be used as the refrigerant.

In the present invention, instead of providing the cooling device in the vacuum degassing vessel 10, the cooling device may be provided between an outlet of the downfalling pipe 18 and an inlet of the forming treating vessel (not shown), such as at a stirrer (not shown) which is arranged at the downstream pit 28 as required to promote the homogeneity in the molten glass G after degassing. The provision of the cooling device at such a position may control the inlet temperature of the forming treating vessel as the successive treating vessel to a certain temperature.

However, a heating device for commencement of operation (not shown) is provided to carry out heating for commencement of operation in the apparatus according to the present invention as well since the respective portions of the vacuum degassing apparatus 10, specifically the uprising pipe 16, the vacuum degassing vessel 14 and the downfalling pipe 18 have a lower temperature than a suitable temperature when starting the degassing treatment or starting to flow the molten glass G. Since the molten glass G is required to exist not only in the upstream pit 26 but also the downstream pit 28 for commencement of operation, it is preferable that a bypass (not shown) is provided to flow the molten glass G from the upstream pit 26 to the downstream pit 28 under the siphon principle.

The vacuum degassing apparatus 10 according to the present invention may, of course, be applicable even when the quantity of flow of the molten glass G is less than 15 ton/day. In this case, a heating device 32 is preferably provided to constantly heat the molten glass during operation since there is a possibility that the molten glass G is cooled in the vacuum degassing apparatus 10 and the outlet temperature of the vacuum degassing apparatus is lower than a certain set temperature because the sensible heat carried by the molten glass is small as in the conventional apparatus. In an example of the heating device 32, a heater 32a is wound around an outer circumference of the upper portion of the uprising pipe 16 as shown by dotted lines in FIG. 1. The present invention is not restricted to such an example, and may use known heating devices. Although it is preferable that the heating device 32 is provided at either of the uprising pipe 16 and the inlet side of the vacuum degassing vessel 14 or both positions, the provision of the heating device is not restricted to such positions in the present invention. In the absence of the heating device at such positions or the presence of the heating device at such positions, a heating device may be provided at the entire portion or a portion of the vacuum degassing vessel 14, for example, at either of the outlet side of the vacuum degassing vessel and the downfalling pipe 18 or at both portions. The provision of the heating device 32 is required when the degassing throughput of the molten glass G is less than 15 ton/day, in particular 10 ton/day.

In accordance with the present invention, the inlet temperature of the vacuum degassing apparatus 10 (the introduction temperature of the molten glass G), that is to say the outlet temperature of the melting vessel 24, may be raised in comparison with the conventional apparatus, and is not restricted to a specific value. The outlet temperature of the melting vessel may be appropriately selected depending on the kind (the viscosity at a treating temperature) or the throughput of the molten glass G to be degassed, and the material forming the respective portions of the vacuum degassing apparatus 10 such as the kinds or the size of electro-cast refractory material. However, the outlet temperature of the molten glass G at the melting vessel 24 is preferably 1300–1450° C., taking melting cost by heating in the melting vessel 24, the degassing efficiency of the vacuum degassing apparatus 10 and heating or cooling cost inside and outside the apparatus.

There is no limitations on the molten glass G to be dealt with by the vacuum degassing apparatus 10 according to the present invention. Examples of the molten glass are soda-lime glass and boro-silica to glass. Since the vacuum degassing apparatus according to the present invention can deal with a large amount of molten glass, it is better for the apparatus to be used to deal with soda-lime glass which needs treatment in a large amount.

The vacuum degassing apparatus for molten glass according to the present invention is basically constructed as stated earlier, and the operation of the apparatus will be explained.

Before starting the operation of the vacuum degassing apparatus 10, the bypass (not shown) is opened to introduce the molten glass G in the melting vessel 24 into the vacuum degassing apparatus 10 or from the upstream pit 26 into the downstream pit 28, and the lower ends of the uprising pipe 16 and the downfalling pipe 18 are immersed in the molten glass G. After completion of immersion, the vacuum pump (not shown) is operated to draw a vacuum in the vacuum housing 12 through the suction port 12c, consequently to draw a vacuum in the vacuum degassing vessel 14 through the suction ports 14a and 14b, depressurizing the inside of the vacuum degassing vessel 14 to a pressure of $\frac{1}{20}$–$\frac{1}{3}$ atmosphere.

As a result, the molten glass G is risen in the uprising pipe and the downfalling pipe 18 to be introduced into the vacuum degassing vessel 14. The molten glass is filled in the vacuum degassing vessel 14 to have such a certain depth therein so as to establish a certain value of level difference H between the molten glass G in the melting vessel 24 and that in the vacuum degassing vessel 14. Thus, the upper space 14s with a vacuum drawn is provided. After that, the bypass is closed.

Then, the molten glass G is risen in the uprising pipe 16 from the melting vessel 24 through the upstream pit 26, and is introduced into the vacuum degassing vessel 14. While the molten glass G flows in the vacuum degassing vessel 14, the molten glass is degassed under a certain depressurization condition. Specifically, in the vacuum degassing vessel 14 under such a certain depressurization condition, the bubbles in the molten glass G rise in the molten glass G, are blocked by the barriers 30a and 30b and break there. Or the bubbles move up into the upper space 14s, and breaks there. Thus, the bubbles are removed from the molten glass G.

The molten glass G thus degassed is led out from the vacuum degassing vessel 14 into the downfalling pipe 18, flows downwardly in the downfalling pipe 18, is introduced into the downstream pit 28, and is led out from the downstream pit 28 to the successive treating vessel such as the forming treating vessel (not shown).

Since refractory material having a porosity of not greater than 5% is used for the path in the vacuum degassing vessel 14, the number of the bubbles which generate from the refractory material of the vacuum degassing vessel 14 is restricted in an acceptable range, the erosion of the refractory material is restrained, and the life of the vacuum degassing vessel 10 meets with the required level. In the shown example, the quantity of flow or the degassing throughput of the molten glass G can be increased with the same size and the same pressure loss maintained in comparison with the conventional vacuum degassing vessel 104 having a circular section and made of noble metal since at least the vacuum degassing vessel has a rectangular section and made of refractory material such as electro-cast refractory material having a porosity of not greater than 5%. The shown example can significantly increase the quantity of flow and the degassing throughput without making the size of apparatus excessively larger since only the width can be expanded without changing the height.

In accordance with the present invention, heating the molten glass G during degassing which has been needed in the conventional apparatus can be eliminated, and consequently the heating device for such heating is not required since the degassing throughput can be increased. When the cooling device 22 is provided to cool the molten glass G, in particular to cool the molten glass G after degassing in the apparatus according to the present invention, the degassing throughput can be further increased without making the size of apparatus larger in comparison with the size of other apparatuses such as the melting vessel 24 and the forming treating vessel.

As explained, in accordance with the first and second modes of the present invention, refractory material having a porosity of not greater than 5%, instead of noble metal alloy such as platinum alloy, can be used in a portion of the path in direct contact with the molten glass such as the vacuum degassing vessel, the uprising pipe and the downfalling pipe to build the vacuum degassing apparatus at a lower cost than use of noble metal such as platinum. In addition, the number of the bubbles which generate from the pores in the refractory material is restrained, to put the number of the bubbles in the molten glass in the acceptable range, preventing the quality of glass products from lowering. The erosion in the path by the molten glass can be also restrained to satisfy the path life which is required to the vacuum degassing apparatus.

In accordance with the first and second modes of the present invention, the quantity of flow of the molten glass, consequently, the degassing throughput of the molten glass can be increased while maintaining the size and the same pressure loss as the conventional apparatus. For example, since only the width of the vacuum degassing vessel can be extended without changing the height of the vacuum degassing vessel, the quantity of flow can be further increased and the degassing throughput can further increased without making the size of apparatus excessively larger.

In accordance with the first and second modes of the present invention, the degassing throughput can be increased to eliminate heating of the molten glass during degassing which has been required in the conventional apparatus. There is no need for the heating device for such heating.

When the cooling device is provided to cool the molten glass, in particular to cool the molten glass after degassing in the first and second modes of the present invention, the quantity of flow of the molten glass and the degassing throughput of the molten glass can be further increased without making the size of apparatus larger in comparison with the size of other apparatuses such as the melting vessel and the forming treating vessel.

Now, the vacuum degassing apparatus for molten glass according to the third mode of the present invention will be described in detail, referring to FIGS. 5 and 6.

Figure 5:
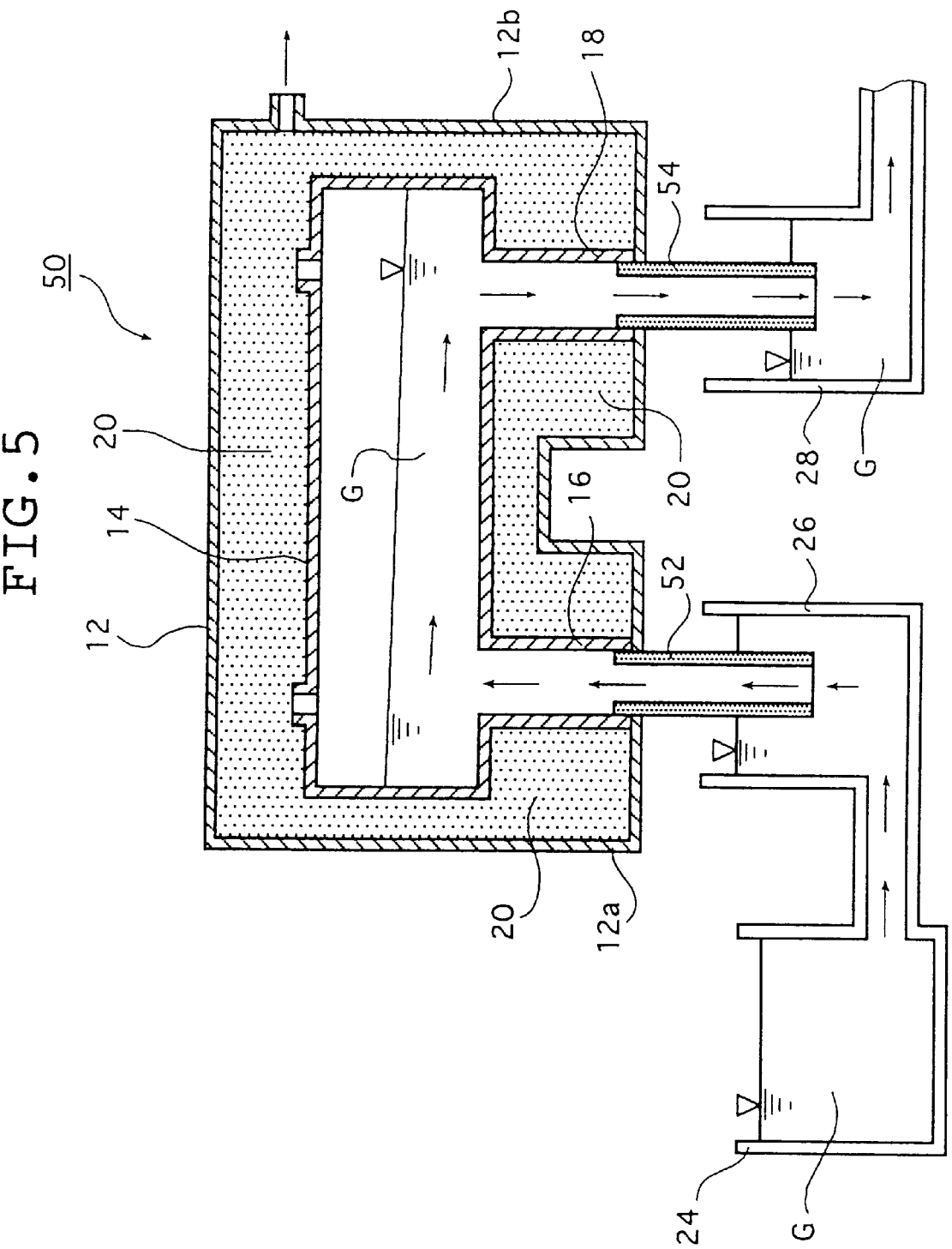
FIG. 5 is a schematic vertical sectional view of the vacuum degassing apparatus according to another embodiment of the present invention.

In FIG. 5 is shown a schematic vertical sectional view of the vacuum degassing apparatus for molten glass according to the third mode of the present invention.

The vacuum degassing apparatus 50 according to this mode is used in a process wherein the molten glass G in the melting vessel 24 is vacuum-degassed and is continuously supplied to a successive treating vessel such as a floating bath as a forming treating vessel for plate glass and a forming operating vessel for bottle (not shown). As shown in FIG. 5, the apparatus is basically constituted by a vacuum housing 12, a vacuum degassing vessel 14, an uprising pipe 16, a downfalling pipe 18 and extending pipes 52 and 54.

The vacuum degassing apparatus 50 basically has the same structure as the vacuum degassing apparatus 10 shown in FIG. 1 except that the uprising pipe 16 and the downfalling pipe 18 have lower ends provided with the extended pipes 52 and 54 made of noble metal such as platinum. Identical parts are indicated by the same reference numerals, and detailed explanation of these arts will be omitted. The parts that are shown in FIG. 1 but not shown in FIG. 5 are omitted for simplification of the drawings, and these parts may be provided as required. Although the following explanation will be made with respect to a typical example wherein electro-cast bricks 56 are used as refractory furnace lining forming the vacuum degassing apparatus 50 according to this mode, the present invention is not limited to this example. Any kind of refractory material is acceptable as long as the refractory material which has been explained with respect to the first and second modes of the present invention is used.

In the vacuum degassing apparatus 50 according to this mode, the main portions such as the vacuum degassing vessel, the uprising pipe and the downfalling pipe 18 are constituted by the electro-cast bricks 56.

The lower end of the uprising pipe 16 is required to be fitted into the open end of the upstream pit 26 and be immersed into the molten glass G in the upstream pit 26. The lower end of the downstream pipe 13 is also required to be fitted into the open end of the downstream pit 28 and to be immersed into the molten glass in the downstream pit 28. The reason why the lower end of each of the pipes is required to be fitted into the open end of each of pits is that the entire vacuum degassing apparatus is vertically movable with the depressurizing condition maintained, allowing the operation to be carried out under different depressurizing conditions.

However, when the lower end of the uprising pipe 16 which is fitted into the upstream pit 26 and is immersed into the molten glass G is also made of the electro-cast bricks 56, there is provided a problem in that joints between the bricks and an interface of the bricks are likely to deteriorate to cause breakage such as fracture, preventing sufficient durability from being obtained as stated earlier.

When the lower end of the downfalling pipe 18 which is fitted into the open end of the downstream pit 28 and is immersed into the molten glass G is made of the electro-cast bricks 56, the same problem arises.

In this mode with the extended pipes used, the uprising pipe 16 and the downfalling pipe 18 have the lower ends provided with the extended pipes 52, 54 made of platinum or platinum alloy, and the extended pipes 52, 54 are fitted in the upstream pit 26 and the downstream pit 28 to be immersed in the molten glass G therein, respectively, as shown in FIG. 5. Such arrangement can dispense with direct immersion of the uprising pipe 16 and the downfalling pipe 18 made of the electro-cast bricks into the molten glass G, and significantly improve the durability against the molten glass G in the upstream pit 26 and the downstream pit 28 to solve the problem. In addition, it is easy to move the entire vacuum degassing apparatus vertically.

Figure 6:
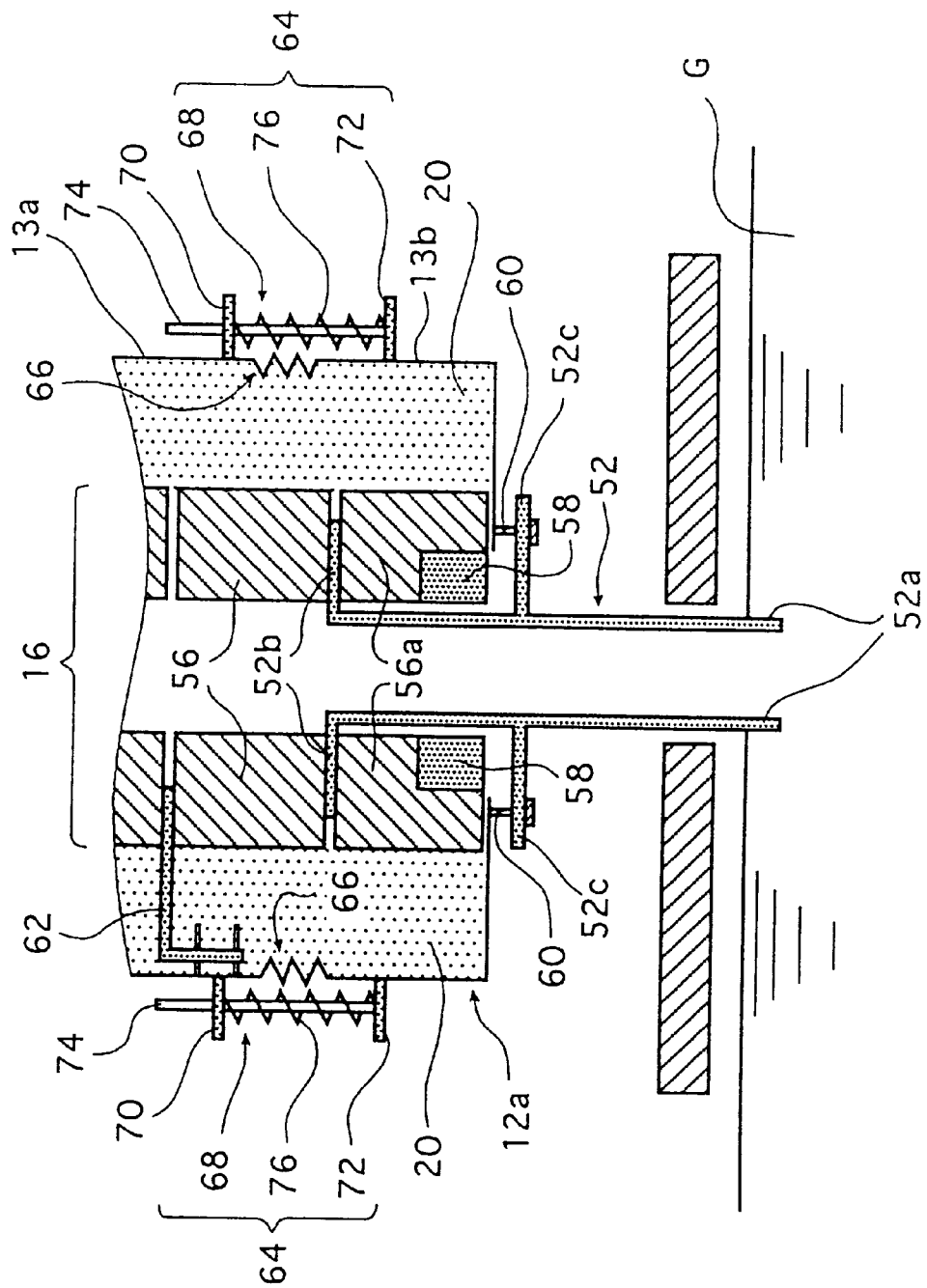
FIG. 6 is a schematic vertical sectional view of a connecting portion between an uprising pipe and an extending pipe in the apparatus shown in FIG. 5.

Specifically, the extending pipe 52 made of platinum or platinum alloy is provided to communicate with the lower end of the uprising pipe 16 as shown in FIG. 6. Since the extending pipe 54 on the side of the downfalling pipe 18 is formed in the same way as the extending pipe 52 on the side of the uprising pipe 16, explanation will be made with respect to only the extending pipe 52 on the side of the uprising pipe 16, and explanation of the extending pipe 54 on the side of the downfalling pipe 18 will be omitted.

The extending pipe 52 includes a cylindrical member 52a, a fixing flange 52b provided at one end of the cylindrical member 52a, and a sealing flange 52c provided on the cylindrical member away from the fixing flange 52b by a certain distance, and is made of platinum or platinum alloy. The inner diameter of the cylindrical member 52a is almost the same as the inner diameter of the uprising pipe 16 so as to provide smooth communication with the uprising pipe 16.

The fixing flange 52b is inserted between electro-cast bricks 56, 56 forming the uprising pipe 16 or joints between the bricks to fix the upper end of the extending pipe to the uprising pipe 16.

Although fixing of the extending pipe 52 to the uprising pipe 16 may be carried out by other measures without use of the fixing flange 52b, it is preferable that the extending pipe is fixed by using the fixing flange 52b. Unless the cylindrical member 52a has the upper end provided with the fixing flange 52b, there may be created a problem in that the molten glass G enters between the outer surface of the cylindrical member 52a and the electro-cast bricks 56, and thermal insulation bricks 20 and thermal insulation material 58 are eroded to increase the thermal conductivity in the vicinity of a bottom of a housing leg 12a so as to elevate the temperature on an outer wall surface of the housing, causing the housing to be deformed. The provision of the fixing flange 52b at the upper end of the cylindrical member 25a can solve this problem as well. The provision of the fixing flange can prevent the temperature of the housing leg 12a from increasing and avoid downward distortion caused by the raised temperature. As a result, leakage of the molten glass G which is caused by a shift or a slack in joints of the electro-case bricks 56 or the thermal insulation bricks 20 in the housing leg 12a, and consequently an excessive increase in the temperature of the housing leg 12a can be prevented.

Thus, deformation of the entire apparatus due to thermal stress which is caused by a local increase in temperature, and an accelerative increase in temperature due to an increase in the leakage of the molten glass G can be also avoided.

On the other hand, the sealing flange 52c cooperates with sealing members 60 explained later to close a lower end of the housing leg 12a from outwardly so as to ensure airtightness in the vacuum housing 12 when the extending pipe 52 is provided at the lower end of the uprising pipe 16. The sealing flange 52c may be used as an electrode to make the extending pipe 52 made of platinum or platinum alloy self-heated, maintaining a suitable temperature. With respect to the measures to ensure airtightness at the lower end of the housing leg 12a, not only the sealing flange 52c but also other measures can be used.

Although it is preferable that fixing of the extending pipe 52 to the uprising pipe 16 is borne by the fixing flange 52b as explained, the sealing flange 52c may perform both functions to provide vacuum sealing and bear the weight of the extending pipe 52, and the fixing flange 52b may perform only a function to prevent an outer surface of the extending pipe from separating from inner surfaces of the electro-cast bricks 56a in a passage surrounded by the bricks 56a. In this case, the fixing flange 52b performs not only a function to avoid minute misalignment of the extending pipe 52 in the horizontal direction but also a function to prevent the molten glass G from entering between the outer surface of the extending pipe and the inner surfaces of the bricks.

Although there is no limitations on the composition of the platinum or the platinum alloy used in the extending pipes 52, 54, it is preferable that the extending pipes are made of platinum alloy including 70 wt %–98 wt % of platinum and not less than 2 wt % of Rh in terms of superior strength at elevated temperatures.

The extending pipe 52 thus constructed has the fixing flange 52b inserted and sandwiched in the joints between the electro-cast bricks in the vicinity of the lower end of the uprising pipe 16, and the sealing members 60 are provided between the sealing flange 52c and the vacuum degassing housing 12 to ensure airtightness at the lower end of the housing leg 12a. There is no limitations on the sealing members 60 as long as the sealing members have airtightness and thermal resistance. Since it is sufficient that the inside of the housing 12 is depressurized to an atmospheric pressure of $\frac{1}{20}$ at the most, vacuum sealing material which is normally used in a vacuum device and has thermal resistance can be selected.

Although the extending pipe 52 has the fixing flange 52b sandwiched in the joints between the electro-cast bricks 56 as explained, the sandwiching force is provided by the empty weight of the electro-cast bricks 56. If the number of the electro-cast bricks 56 which are piled on the fixing flange 52b is small, there is a possibility that the joints can open due to expansion and shrinkage by the molten glass G to lower the sandwiching force, causing the molten glass G to leak because of insufficient sandwiching of the fixing flange 52b.

In order to cope with this problem, a reinforcing member 62 is provided above the extending pipe 52 as shown in FIG. 6 to reinforce the sandwiching force to the fixing flange 52b by the electro-cast bricks 56. There is no limitations on the material and the structure of the reinforcing member 62 as long as the reinforcing member can downwardly push the electro-cast bricks 56 above the fixing flange 52b. For example, when the electro-cast bricks 56 are piled high above the fixing flange 52b, it is possible to firmly sandwich the fixing flange 52b by the empty weight of the bricks without use of the reinforcing member 62.

It is preferable that the electro-cast bricks 56a which are provided at the lowest position in the housing leg 12a have inner lower corners facing the extending pipe 52 and the bottom of the housing leg 12a cut out in a circumferential direction, and the thermal insulation material 58 is provided in the cutouts as shown in FIG. 6. Since a portion of the bottom of the housing leg 12a which is near to the circumference of the extending pipe 52 is most easily heated, there is a possibility that the temperature of that portion is excessively raised to produce distortion or deformation, inviting the leakage of the molten glass G from the joints into a thermal insulating brick layer 20. The provision of the thermal insulation material 58 in the vicinity of the extending pipe 52 can prevent the temperature of the bottom of the housing leg 12 from being excessively raised to further improve the durability at that portion. By providing the thermal insulation material 58 only at the lower portions of the electro-cast bricks 56, sufficient strength can be ensured at upper portions of the electro-cast bricks 56a to firmly sandwich the fixing flange 52b.

There is no limitations on the thermal insulating material 58 as long as the thermal insulating material has a high thermal insulation property than the electro-cast bricks 56.

As explained, the lower end of the uprising pipe 16 which is immersed into the molten glass G in the upstream pit 26, and the lower end of the downfalling pipe 18 which is immersed into the molten glass G in the downstream pit 28 can be made of platinum or platinum alloy to prevent the lower end of the uprising pipe 16 and the lower end of the downfalling pipe 18 from being degraded or broken and to ensure sufficient durability to the molten glass G.

It is preferable that the housing leg 12*a* is provided with a cushioning device 64 so as to be capable of expanding and contracting, depending on thermal expansion and thermal shrinkage of the electro-cast bricks 56 or the thermal insulting bricks 20 in the vertical direction. When the electro-cast bricks 56 forming the uprising pipe 16 or the thermal insulation bricks 20 around the electro-cast bricks thermally expand, the cushioning device 64 can absorb the thermal expansion of the uprising pipe 16. When these bricks contract, the cushioning device contacts the housing leg 12*a* so as to follow the shrinkage of these bricks, preventing the joints from being opened by the shrinkage to avoid the leakage of the molten glass G respectively. The breakage of the vacuum housing 12 and a drop in the depressurizing degree caused thereby can be prevented to improve the durability and the safety of the apparatus.

Specifically, the cushioning device 64 includes a cylindrical bellows 66 and lifting devices 68 as shown in FIG. 6. The cylindrical bellows 66 is a member which hermetically and flexibly couples an upper portion (hereinbelow, referred to as the upper portion 13*a*) and a lower portion (hereinbelow, referred to as the lower portion 13*b*) of the housing leg 12*a* which are cut and separated in the horizontal direction. Although there are no limitations on the kind of the cylindrical bellows 66, it is preferable that the cylindrical bellows is made of metal, in particular stainless steel as in the vacuum housing 12.

As long as the lifting devices 68 can upwardly urge the lower portion 13*b* of the housing leg 12*a*, there are no limitations on the lifting devices, and various kinds of mechanism can be adopted. For example, each of the lifting devices may be constituted by a pair of coupling members 70, 72 to be fixed to the upper portion 13*a* and the lower portion 13*b* in a confronting way, a bar 74 having a lower end fixed to the lower coupling member 70 and passing through a hole in the upper coupling member 70, and an urging member 76 connecting both coupling members 70, 72 and upwardly urging the lower portion 13*b* as shown in FIG. 6. Although there are no limitations on the urging member 76, a preferable example of the urging member is a coiled spring. This arrangement can downwardly escape the thermal expansion of the electro-cast bricks 56 or the thermal insulation bricks 20 against the urging force from each of the urging members 76 to avoid the distortion or the damage of the apparatus caused by the thermal expansion, improving the safety of the apparatus. When the electro-cast bricks 56 or the thermal insulation bricks 20 contract, this arrangement can make the lower portion 13*b* follow the shrinkage to prevent the joints from being opened. It is preferable that such a lifting device 68 is provided at plural positions to the cylindrical bellows 66 arranged in a single form.

The housing leg 12*a* may have the lower end reinforced by ribs.

An example of the process wherein the molten glass G is degassed by the vacuum degassing apparatus 50 according to the third mode and the degassed molten glass is continuously supplied to a successive treating furnace will be described.

A vacuum pump (not shown) is used to draw a vacuum in the vacuum housing 12 and in the vacuum degassing vessel 14. Under such a state, the glass G which has been molten in the melting vessel 24 passes through the upstream pit 26, rises in the extending pipe 52 and the uprising pipe 16 to be introduced into the vacuum degassing vessel 14, and are degassed in the vacuum degassing vessel 14 under a certain depressurizing condition. The degassed molten glass G is led to the downstream pit 28 through the downfalling pipe 18 and the extending pipe 54.

As explained in detail, in accordance with the third mode of the present invention, the vacuum degassing apparatus for molten glass, which remove the bubbles from the molten glass continuously supplied, can significantly decrease cost while ensuring sufficient durability to the molten glass at an elevated temperature, and consequently the apparatus can have a larger capacity and the vacuum degassing temperature can be elevated. The apparatus according to this mode is extremely suited when a large quantity of flow of the molten glass is vacuum-degassed in a high effective way.

Now, the vacuum degassing apparatus for molten glass according to the fourth mode of the present invention will be described in detail, referring to FIGS. 7 and 8.

Figure 7:
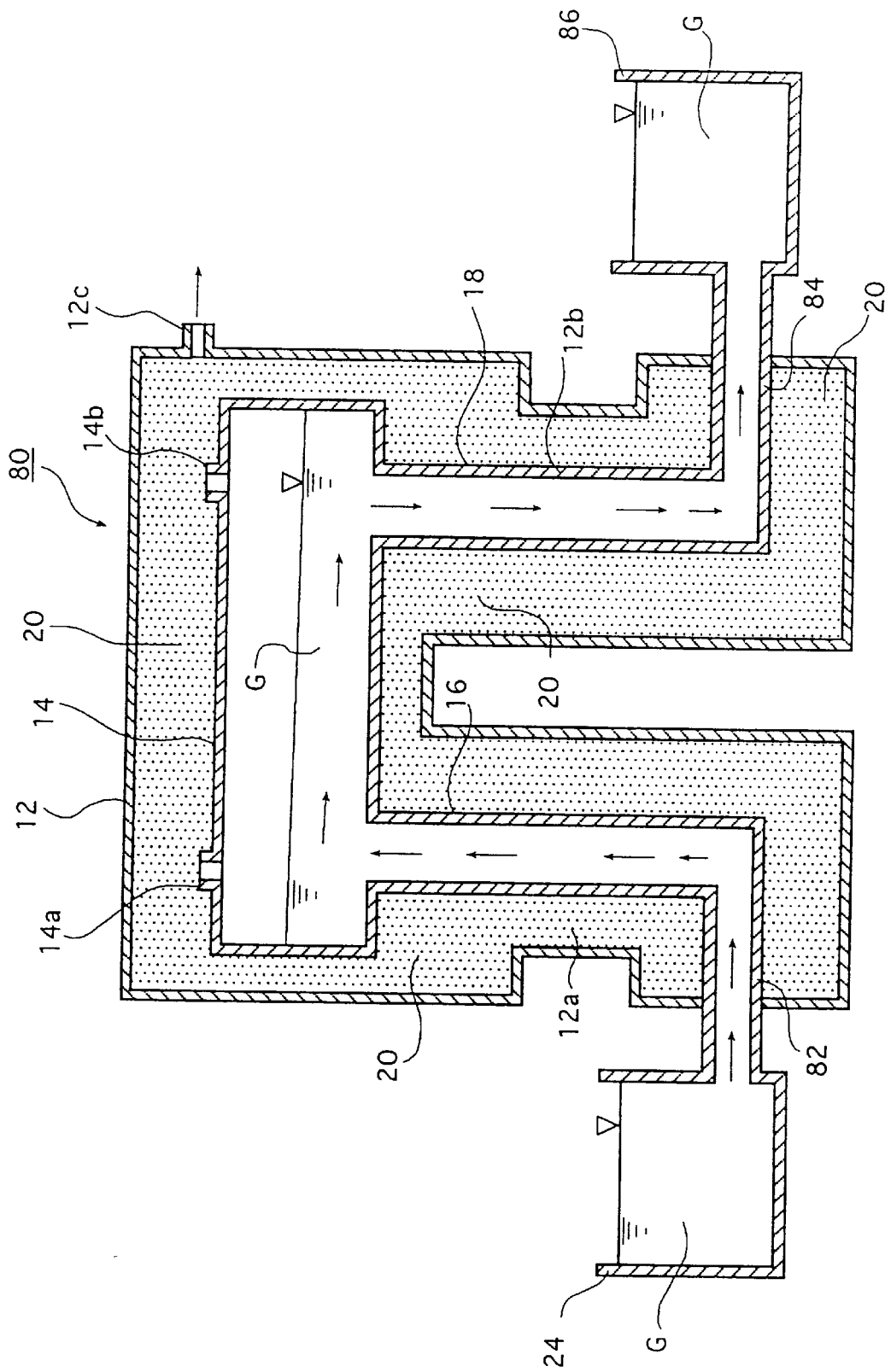
FIG. 7 is a schematic vertical sectional view of the vacuum degassing apparatus for molten glass according to another embodiment of the present invention.
Figure 8:
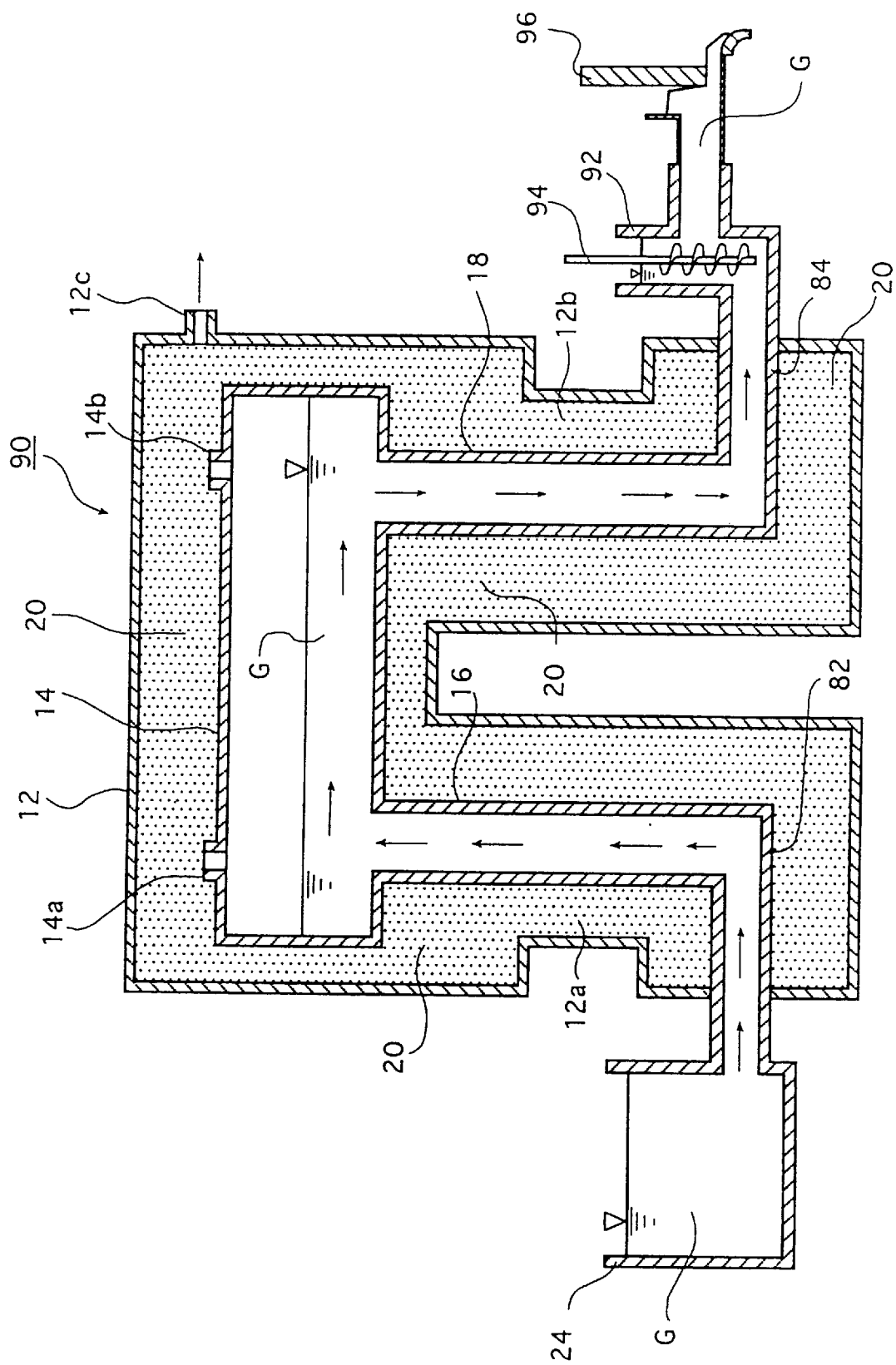
FIG. 8 is a schematic vertical sectional view of the vacuum degassing apparatus for molten glass according to another embodiment of the present invention.

In FIG. 7 is shown a schematic vertical sectional view of an example of the vacuum degassing apparatus for molten glass according to the fourth mode of the present invention.

The vacuum degassing apparatus 80 for molten glass according to this mode is used in a process wherein the molten glass G is sucked up from the melting vessel 24 into a vacuum degassing vessel 14, the molten glass is vacuum-degassed in the vacuum degassing vessel 14 under a depressurizing state, and the degassed molten glass is continuously supplied to a successive treating vessel 86 such as a floating bath as a forming treating vessel for plate glass or a forming operating vessel for bottle. As shown in FIG. 7, the apparatus is basically constituted by a vacuum housing 12, the vacuum degassing vessel 14, an uprising pipe 16, a downfalling pipe 18, an upstream connecting passage 82 and a downstream connecting passage 84.

The vacuum degassing apparatus 80 shown in FIG. 7 basically has the same structure as the vacuum degassing apparatus 10 shown in FIG. 1 except for the structures of lower ends of the uprising pipe 16 and the downfalling pipe 18. Identical parts are indicated by the same reference numerals, and explanation of these parts will be omitted. The parts which are omitted in FIG. 7 may be provided as required. Although explanation of the vacuum degassing apparatus according to this embodiment is also made with respect to a typical example wherein electro-cast bricks are used as refractory material, the present invention is not limited to use of the electro-cast bricks. Any refractory material is acceptable as long as the refractory material used in the first and second modes of the present invention is used.

The vacuum degassing apparatus shown in FIG. 7 is different from the vacuum degassing apparatus 10 shown in FIG. 1 in that the uprising pipe 16 and the downfalling pipe 18 do not have the lower ends immersed in the upstream and downstream pits 26 and 28, that the uprising pipe 16 and the downfalling pipe 18 have the lower ends directly connected to the melting vessel 24 and the successive treating vessel 86 through the upstream and downstream connecting passages 82 and 84, respectively, and that a series of closed passages are constituted from the melting vessel 24 to the successive treating vessel 86 through the upstream connecting passage 82, the uprising pipe 16, the vacuum degassing vessel 14, the downfalling pipe 18 and the downstream connecting passage 84. The vacuum housing 12 entirely cover the-vacuum degassing vessel 14, the uprising pipe 16 and the downfalling pipe 18, and the upstream and downstream connecting passages 82 and 84 pass through legs 12*a*, 12*b* of the vacuum housing 12, respectively, which is formed in a rectangular arched shape.

Specifically, in the vacuum degassing apparatus 80, the uprising pipe 16 has an upper portion upwardly and vertically passed in a left end portion of the vacuum degassing vessel 14, and the downfalling pipe 18 has an upper portion downwardly and vertically passed in a right end portion of the vacuum degassing vessel 14. The lower ends of the uprising pipe 16 and the downfalling pipe 18 are, respectively, connected to the upstream connecting passage 82 in communication with the melting vessel 24 and the downstream connecting passage 84 in communication with the successive treating vessel 86 at a location which is lower than the liquid surface of the molten glass G in the melting vessel 24 and the successive treating vessel 86 as constructed as an open channel. Thus, such a series of closed passages are provided as explained.

Spaces between the vacuum degassing vessel 14 and the vacuum housing 12 and between the uprising and downfalling pipes 16, 18 and the vacuum housing 12 are filled with thermal insulation material 20 made of e.g. fire bricks to cover the vacuum degassing vessel and the uprising and downfalling pipes for thermal insulation. The vacuum housing 12 made of metal, the thermal insulation material 20 made of fire bricks and the vacuum degassing vessel 14 made of electro-cast bricks are provided in that order from outside to inside to provide a multi-layered sectional structure. The thermal insulation material 20 has air-permeability so as not to be a bar to draw a vacuum in the vacuum degassing vessel 14.

In the vacuum degassing apparatus 80 shown in FIG. 7, the vacuum degassing vessel 14, the uprising and downfalling pipe 16, 18, the upstream and downstream connecting passages 82, 84, the melting vessel 24 and the successive treating vessel 86 which form the series of closed passages are all made of electro-cast bricks.

The vacuum degassing apparatus 80 can significantly reduce cost in comparison with the conventional apparatus with molten glass paths made of platinum or platinum alloy by using electro-cast bricks to constitute portions of the molten glass paths in direct contact with the molten glass G, which are formed as the series of passages between the melting vessel 24 and the successive treating vessel 86 with the molten glass having a free surface therein. Since it is possible to design the vacuum degassing vessel 14 so as to have any shape and any wall thickness, the vacuum degassing apparatus 80 can be constructed not only to have a large capacity but also to carry out the vacuum degassing treatment at a higher temperature. The electro-cast bricks has superior durability at a high temperature in comparison with ordinary fire bricks, and are capable of minimizing bubble generation or elution of components. In particular, there is almost no elution of the components into the molten glass, and the elution of components can be ignored when producing window glass for buildings or automobiles, or bottle glass.

In the case of producing glass in mass production like glass for buildings or automobiles, the presence of fine bubbles having a diameter not greater than a certain size is acceptable. For example, the presence of fine bubbles having a diameter of not greater than 0.3 mm is acceptable in the case of glass for buildings. The bubbles which originate from electro-cast bricks are acceptable since the diameter of almost all bubbles is not greater than 0.1 mm and since the occurrence of bubbles having a diameter greater than 0.2 mm ceases with lapse of a certain period of time.

According to the experiment that the inventors made at the vacuum degassing apparatus 80 shown in FIG. 7, it was proved that the bubble distribution generated in the vacuum degassing vessel 14 under the above-mentioned depressurizing condition included many bubbles having a diameter of not greater than 0.2 mm and only an few bubbles of greater than 0.2 mm, and that when the soda lime composition used as glass for buildings or automobiles was produced at 1285° C., the generation of bubbles having a diameter of greater than 0.2 mm ceased in 7 days since commencement of the test though bubbles having a diameter not greater than 0.2 mm continued to generate.

Although the vacuum degassing apparatus 80 shown in FIG. 7 wherein all portions in contact with the molten glass G are made of electro-cast bricks is not appropriate to production of glass for electronic usage or for optical usage wherein the presence of bubbles having a diameter of greater than 0.02 mm is a problem, the apparatus can be applied to production of glass for buildings or automobiles wherein the presence of bubbles having a diameter of less than 0.3 mm is acceptable. A large amount of fine bubbles having a diameter not greater than the acceptable limit does not create any problem in the production of glass for buildings or automobiles.

The upstream and downstream connecting passages 82 and 84, the melting vessel 24 and the successive treating vessel 86 may be constructed using electro-cast bricks by a construction method similar to that for the vacuum degassing vessel 14, the uprising pipe 16 and the downfalling pipe 18.

The electro-cast bricks used in the present invention have a porosity of not greater than 5%, and the porosity in a casting surface of the bricks is extremely-small, preferably almost 0 though closed pores are in the bricks. Although it is better to use a large size of electro-cast bricks in order to make the vacuum degassing vessel 14, the uprising pipe 16 and the downfalling pipe 18 larger, there are limitations on preparation of electro-cast bricks per se in a large size, and it is difficult to produce large sized electro-cast bricks having a side of greater than 1 m, for instance. For this reason, the present invention requires that a plurality of electro-cast bricks be piled, which necessarily causes the presence of joints between electro-cast bricks. Although it is possible to fill the joints with bond, solo use of electro-cast bricks can not maintain a vacuum, depending on conditions of air or the bond (the deteriorated state) since the joints have a lower compactness than electro-cast bricks and permit the molten glass G to pass therethrough.

In accordance with the present invention, the vacuum housing 12 made of steel plates (stainless steel plate for example) having a heat resistance covers a portion of the upstream connecting passage 82 communicating with the melting vessel 24, the uprising pipe 16, the vacuum degassing vessel 14, the downfalling pipe 18 and a portion of the downstream connecting passage 84 communicating with the successive treating vessel 86 to depressurize the entire inside of the vacuum housing 12 as stated earlier.

In accordance with the present invention, the fire bricks can be initially made thicker unlike platinum, and repairing worn paths becomes extremely less frequent, which is different from use of expensive platinum having in a minimum amount. As a result, it is little necessary to consider in designing of the apparatus measures to interrupt the production of glass so as to repair the paths for the molten glass, and it is not necessary to lift the entire apparatus for repairing the paths. The vacuum degassing apparatus and the paths for molten glass therebefore and thereafter can be constructed in a stationary way. Since it is not necessary to immerse the lower ends of the uprising pipe 16 and the downfalling pipe 18 into the molten glass G having a free surface in existence of air as in the conventional vacuum degassing apparatus 200 shown in FIG. 12, outer surfaces of the uprising pipe 16 and the downfalling pipe 18 which occupy an interface portion between air and the molten glass G can be prevented from degrading, and in particular the joints (the bond) can be prevented from degrading.

In accordance with the structure of the present invention, the entire vacuum housing 12 including the vacuum degassing vessel 14, the uprising pipe 16 and the downfalling pipe 18 can be installed in a stationary way, and lifting as in the conventional vacuum degassing apparatus 200 shown in FIG. 12 is unnecessary, making the commencement of operation and the operations for interruption or stoppage simpler.

The vacuum housing 12 has openings to pass the upstream connecting passage 82 and the downstream connecting passage 84. The openings of the vacuum housing 12 may be provided with a restricted structure so that the diameter of the openings is as near to that of the connecting passages 82, 84 as possible so as to provide airtight connection between outer peripheries of the connecting passages and the openings. From this viewpoint, the vacuum housing 12 preferably has portions near to the openings made of heat resisting steel. However, if the diameter of the openings is too near to that of the connecting passages, the steel material (steel plate) might be molten by heat transferred through the electro-cast bricks. In that case, cooling by water may be carried out to at least a portion of the steel metal (the steel plate).

The air which enters between the openings of the vacuum housing 12 and the upstream and downstream connecting passages 82, 84 can be minimized by a pressure loss of the heat insulation material 20 made of fire bricks which are filled between the vacuum housing and the vacuum degassing vessel 14 where a certain pressure such as a pressure of $1/20$–$1/3$ atmosphere or –400—–600 mmHg is held therein.

Although the downstream connecting passage 84 which is connected to the lower end of the downfalling pipe 18 communicates directly with the successive treating vessel 86 in the example shown in FIG. 7, the present invention is not limited to this example as long as the downstream connecting passage communicates with a downstream open channel wherein the molten glass G has a free surface. For example, the downstream connecting passage may communicate with a stirring vessel 92 as shown in FIG. 8. The stirring vessel 92 is also constituted by electro-cast bricks and has a stirrer 94 provided therein, and the molten glass G in the stirring vessel has a free surface. In FIG. 8, reference numeral 96 designates a discharge regulator (tuyere) which regulates the size of the opening that flows out the molten glass G stirred by the stirrer 94 into a successive treating vessel such as a forming vessel, and which functions a regulator to control the discharge of the molten glass G.

Although not shown, the upstream connecting passage 82 which is connected to the lower end of the uprising pipe 16 may not be connected directly to the melting vessel 24 as shown in FIG. 7. The upstream connecting passage may also communicate with an upstream channel made of electro-cast bricks with the molten glass G having a free surface such as a melting vessel constituted by electro-cast bricks.

Now, the normal operation of the vacuum degassing apparatus for molten glass according to the third mode of the present invention will be described.

In the vacuum degassing apparatus 80 for molten glass according to the present invention shown in FIG. 7, a vacuum pump (not shown) draws a vacuum in the vacuum degassing vessel 14 to maintain the inside of the vacuum degassing vessel at a certain pressure, such as to depressurize the inside of the vacuum degassing vessel to a pressure of $1/20$–$1/3$ atmosphere. The difference between the atmospheric pressure in the vacuum housing 12 and the atmospheric pressure on the liquid surface in the successive treating vessel 86 or the melting vessel 24 formed as an open channel causes the molten glass G to be sucked up into the vacuum degassing vessel 14 through the uprising pipe 16 or the downfalling pipe 18 and the upstream connecting passage 82 or the downstream connecting passage 84. The upstream and downstream connecting passages are located at a lower position than the liquid surface in the melting vessel 24 or the successive treating vessel 86. Thus, a siphon is provided as the series of closed passages, and the molten glass flows out into the successive treating vessel 86 because of the presence of the difference in height of the liquid surface of the molten glass G in the melting vessel 24 and the successive treating vessel 86 and that in the vacuum degassing vessel 14.

At that time, the difference in height between the liquid surface of the molten glass G in the melting vessel 24 or the successive treating vessel 86 and the liquid surface of the molten glass G sucked up in she vacuum degassing vessel 14 is about 2.5 m–about 3.5 m though the difference varies on depressurized pressures in the vacuum degassing vessel 14. The current of the molten glass G in the vacuum degassing vessel 14 is determined by the viscosity (temperature) of the molten glass G and the difference in height between the liquid surface of the molten glass G in the vacuum degassing vessel and that in the melting vessel 24 or the successive treating vessel 86. It is preferable that the current of the molten glass G is not greater than 50 mm/sec since a current of greater than 50 mm/sec accelerates the erosion of the electro-cast bricks forming the paths.

The molten glass G which has been sucked up into the vacuum degassing vessel 14 has bubbles therein risen to the liquid surface and broken since the inside of the vacuum degassing vessel 14 is depressurized to a pressure of $1/20$–$1/3$ atmosphere. The vacuum degassing apparatus 80 removes the bubbles included in the molten glass G in this manner.

Since the viscosity of the molten glass G become lower at a higher temperature, it is easier to remove the bubbles included in the molten glass G as the molten glass G has a higher temperature. As the molten glass G has a higher temperature, the mobility of the molten glass G is raised to increase the quantity of flow of the molten glass G which is degassed during passing in the vacuum degassing vessel 14. From this viewpoint, it is preferable that the viscosity of the molten glass G is not greater than $10^{4.5}$ poise.

It is preferable that inner surfaces of the series of closed passages (paths for the molten glass G) which are constituted by the vacuum degassing vessel 14, the uprising pipe 16, the downfalling pipe 18 and the upstream and downstream connecting passages 82, 84 are heated to the substantially same temperature as the molten glass G in advance in order to start the operation of the vacuum degassing apparatus 80. If such heating is insufficient, there is a possibility that when the molten glass G is sucked up, the molten glass G is cooled to be solidified, making the operation after that impossible.

After such heating is sufficiently made in advance, the molten glass G is flowed from the melting vessel 24 into the upstream connecting passage 82, and a bypass passage (not shown) is opened to flow the molten glass G from the upstream connecting passage 82 into the downstream connecting passage 84 as well to fill the upstream and downstream connecting passages 82 and 84 with the molten glass G. Then, the inside of the vacuum housing 12 is depressurized to suck up the molten glass G into the vacuum degassing vessel 14 through the uprising pipe 16 from the upstream connecting passage 82 and through the downfalling pipe 18 from the downstream connecting passage 84. The molten glass G sucked from the uprising pipe 16 and the molten glass G sucked up from the downfalling pipe 18 join in the vacuum degassing vessel 14. After the vacuum degassing vessel 14 is depressurized to a certain pressure to rise the liquid surface of the molten glass G to a certain height in the vacuum degassing vessel 14, the bypass passage (not shows) is closed, and the vacuum degassing apparatus 80 goes to a normal operation.

As explained in detail, in accordance with the fourth mode of the present invention, the vacuum degassing vessel, the uprising pipe and the downfalling pipe can be constituted by refractory material having a porosity of not greater than 5% such as electro-cast bricks more inexpensive than noble metal alloy such as platinum alloy, and the apparatus can continuously vacuum-degas the molten glass as in the case of using noble metal alloy. The construction cost lowers in comparison with the case of using noble metal alloy such as platinum alloy. It is not necessary to limit the material use in terms of cost and to restrict the size in terms of strength lowered by the limited material use. Design freedom of the apparatus can be significantly improved not only to construct a large quantity of flow of vacuum degassing apparatus but also to carry out the vacuum degassing treatment at a higher temperature.

Since the vacuum degassing apparatus is not required so as to be liftable and the entire apparatus can be installed in a stationary way, the operation for lifting the apparatus which is difficult and accompanied by danger can be eliminated to provide a safer vacuum degassing apparatus.

Now, a parallel arrangement of vacuum degassing apparatus as the vacuum degassing apparatus for molten glass according to the fifth mode of the present invention will be described in detail, referring to FIGS. 9–11.

Figure 9:
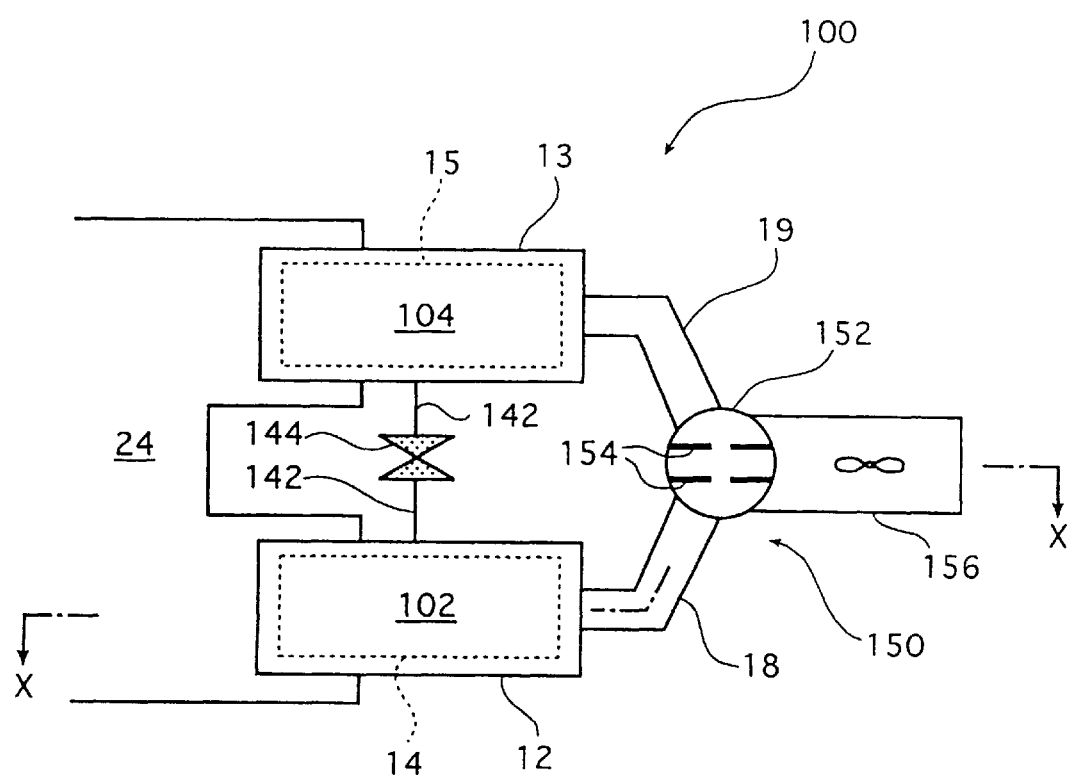
FIG. 9 is a schematic plan view of the parallel arrangement of vacuum degassing apparatus according to an embodiment of the present invention.

In FIG. 9 is shown a schematic top plan view of an example of the parallel arrangement of vacuum degassing apparatus according to this mode.

The parallel arrangement of vacuum degassing apparatus (hereinbelow, referred to as the vacuum degassing apparatus) 100 is used in a process wherein the molten glass G in the melting vessel 24 is vacuum-degassed and is continuously supplied to a successive treating vessel (not shown) such as a floating bath as a forming treating vessel for plate glass and a forming operating vessel for bottles. As shown in FIG. 9, the vacuum degassing apparatus is constituted by a first vacuum degassing unit 102, a second vacuum degassing unit 104, a pressure-equalizing pipe 142 and a merging unit 150.

Since the first vacuum degassing unit 102 and the second vacuum degassing unit 104 have the same structure, explanation of the first vacuum degassing unit 102 will be mainly made, and explanation of the second vacuum degassing unit 104 will be basically omitted.

Figure 10:
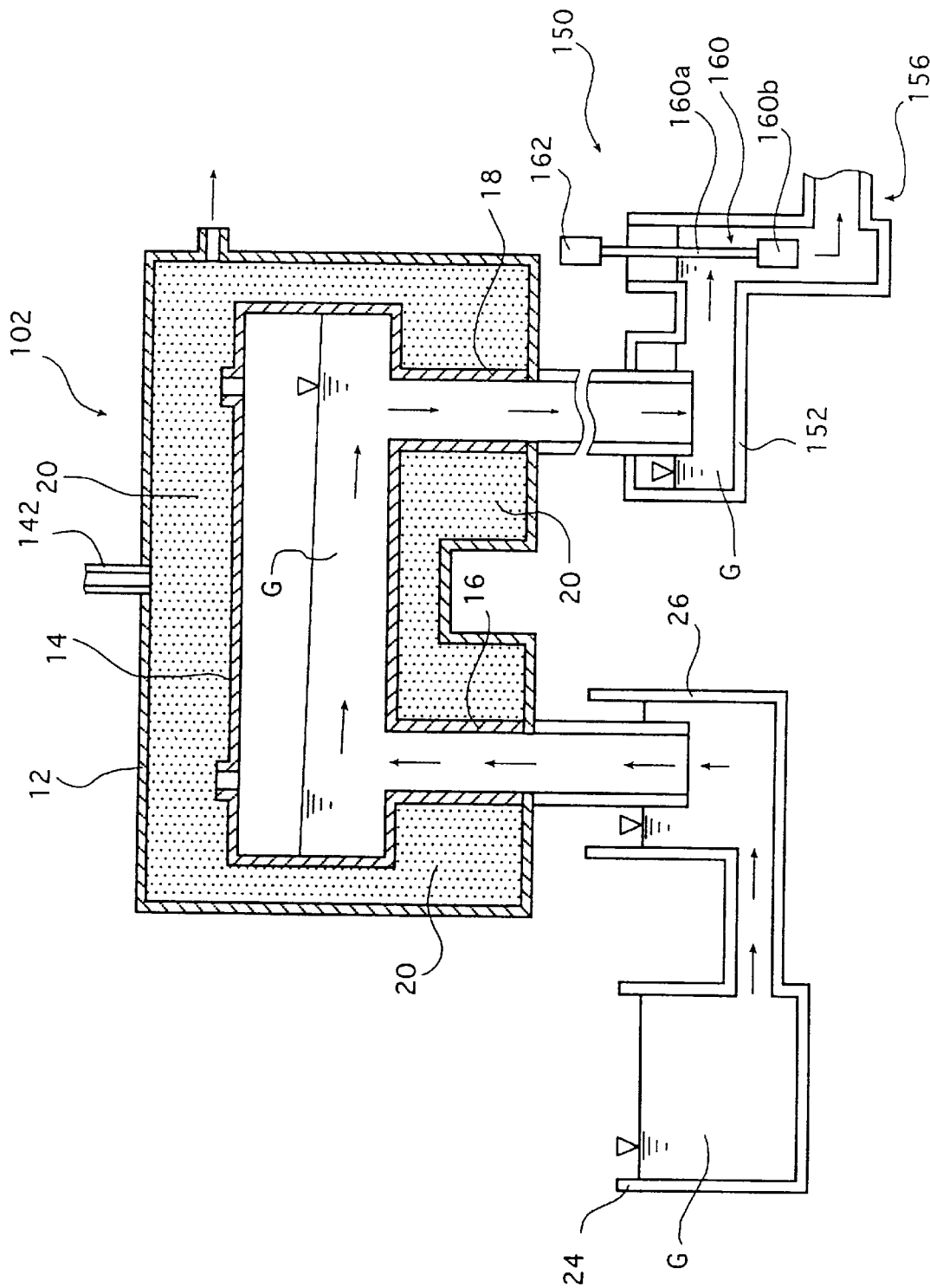
FIG. 10 is a schematic sectional view of a first vacuum degassing unit and a merging unit in the apparatus shown in FIG. 9 and taken along the line X—X of FIG. 9.

In FIG. 10 is shown a schematic vertical sectional view of the first vacuum degassing unit 102 and the merging unit 150 of the vacuum degassing apparatus 100, taken along the line X—X of FIG. 9.

The first vacuum degassing unit 102 includes a vacuum housing 12, a vacuum degassing vessel 14, an uprising pipe 16 and a downfalling pipe 18. Since the main parts of the first vacuum degassing unit 102 shown in FIG. 10 have basically the same structure as the main parts of the vacuum degassing apparatus 10 shown in FIG. 1, identical parts are indicated by the same reference numerals, and explanation of these parts will be omitted.

Although the uprising pipe 16 and the downfalling pipe 18 are arranged in the legs of the vacuum housing 12, the downfalling pipe 18 as well as a downfalling pipe 19 of the second vacuum degassing unit 104 slants or has a portion thereof bent so as to communicate the merging unit 150 as explained later.

In the vacuum degassing apparatus 100 according to the present invention, there are no limitations on the material of the vacuum degassing vessel 14, the uprising pipe 16 and the downfalling pipe 18. Examples of the material are noble metal or noble metal alloy such as platinum, and platinum-rhodium and platinum-palladium as platinum alloy, electro-cast refractory material and fine burned refractory material. Of such kinds of material, refractory material having a porosity of not greater than 5% is preferably used. When the main parts of the vacuum degassing apparatus 100 which directly contact with the molten glass G are constituted by such refractory material, the construction cost can be significantly reduced in comparison with the conventional apparatus with noble metal alloy used. The vacuum degassing apparatus can be constructed so as to have any shape and any thickness to provide the vacuum degassing apparatus 100 with a large capacity and to carry out the vacuum-degassing treatment at a higher temperature.

A lower portion of the uprising pipe 16 which is immersed in the molten glass G in the upstream pit 24, and a lower portion of the downfalling pipe 18 which is immersed in the molten glass G in a defining wall 152 of furnace lining stated later are highly reactive because of the presence of the interface of molten glass G and air. Normal burned bricks except for fine burned refractory bricks having a porosity of not greater than 5% are not durable. Even if refractory material having a porosity of not greater than 5% is used, degradation of the interface portions or the joints is likely to develop. It is preferable that the lower portion of the uprising pipe 16 and the lower portion of the downfalling pipe 18 are made of platinum or platinum alloy.

Since the vacuum degassing apparatus 100 according to the present invention has a parallel arrangement with the first vacuum degassing unit 102 and the second vacuum degassing unit 104 included therein, the molten glass which has passed through both vacuum degassing units 102, 104 can join in the merging unit 150 to vacuum-degas a large amount of molten glass and to promptly cope with a change in production, such as by operating only one of both vacuum degassing units.

However, if both vacuum degassing units are combined in a parallel arrangement without modification, there is a possibility that the composition of the molten glass G obtained in the vacuum degassing unit 102 and that obtained in the vacuum degassing unit 104 may be slightly different. For example, since it is technically difficult to provide the completely same depressurization in the vacuum degassing vessels 14, 15 in both vacuum degassing units 102, 104, both vacuum degassing vessels 14, 15 have different pressures on the gas phase in contact with the molten glass G, and both vacuum degassing vessels have different concentrations (partial pressures) in the gas phase of the gaseous components (e.g. $SO_2$, $Co_2$ and so on in the case of soda-lime glass) of the molten glass G which pass through both vacuum degassing units. The molten glass which passes through each of units contacts with different compositions of the gas phase components. Since such difference in the composition history of the molten glass is produced so as to contain slightly different gaseous components, merging can cause the generation of bubbles. There can be differences in volatile components, such as $Na_2O$ in the mother compositions. The molten glass which is obtained by merging molten glass having different compositions is likely to have irregularities in the composition, creating a problem in that sufficient homogeneity can not be obtained to lower the optical characteristics of glass products.

In accordance with the present invention, the pressure-equalizing pipe 142 can be provided to communicate between the first vacuum degassing unit 102 and the second vacuum degassing unit 104 so as to obtain molten glass G having superior homogeneity while being capable of vacuum-degassing the molten glass G in a large amount.

Specifically, as shown in FIG. 9, the pressure-equalizing pipe 142 is provided between the vacuum housing 12 in the first vacuum degassing unit 102 and a vacuum housing 13 in the second vacuum degassing unit 104 to communicate both housings.

The pressure-equalizing pipe 142 is one that maintains the gas phase in each of both vacuum degassing vessels 14, 15 at the same pressure. For example, the pressure-equalizing pipe 142 has both ends connected to the vacuum housings 12, 13, communicating between both vacuum degassing units 102, 104 as shown in FIG. 10. There are no limitations on where the pressure-equalizing pipe 142 should be connected to. It is enough for the pressure-equalizing pipe to provide communication between at least both vacuum housings 12, 13. Although there are no limitations on the material and the shape of the pressure-equalizing pipe 142, the pressure-equalizing pipe is preferably made of stainless steel.

Since the communication between both vacuum degassing units 102, 104 equalizes the gas phase pressures in both vacuum degassing vessels 14, 15, the gaseous components (e.g. $SO_2$, $Co_2$ and so on in the case of soda-lime glass) and the partial pressure (concentrations) of the fugacious components (e.g. $Na_2O$ and so on) in the glass included in the gaseous phase can be made equal in both vacuum degassing vessels. Thus, the molten glass G which has passed through both vacuum degassing units 102, 104 can have the same composition history to equalize the composition of the molten glass G vacuum-degassed by both vacuum degassing units 102, 104, providing the merged molten glass G with a minimum number of bubbles, minimized irregularity in composition and superior homogeneity.

It is preferable that the pressure-equalizing pipe 142 has a cock 144 arranged therein to close the pressure-equalizing pipe 142 so as to shut the communication between both vacuum degassing vessels 14, 15. If one of the vacuum degassing units 102 or 104 is out of order because of maintenance and so on, the pressure-equalizing pipe 142 can be closed by the cock 144 to continuously operate the other of the vacuum degassing unit 102 or 104, minimizing an obstacle to production of glass products. In particular, it is quite effective to repair the platinum or platinum alloy forming the vacuum degassing vessel 14, the uprising pipe 16 or the downfalling pipe 18 since it takes several months to repair it.

The molten glass G which has been vacuum-degassed by the vacuum degassing units 102, 104 reaches the merging unit 150 through the respective downfalling pipes 18, 19.

The merging unit 150 merges and stirs the molten glass G supplied from the two vacuum degassing units 102, 104, and supplies the molten glass to the inlet of a next step, such as a spout.

Figure 11:
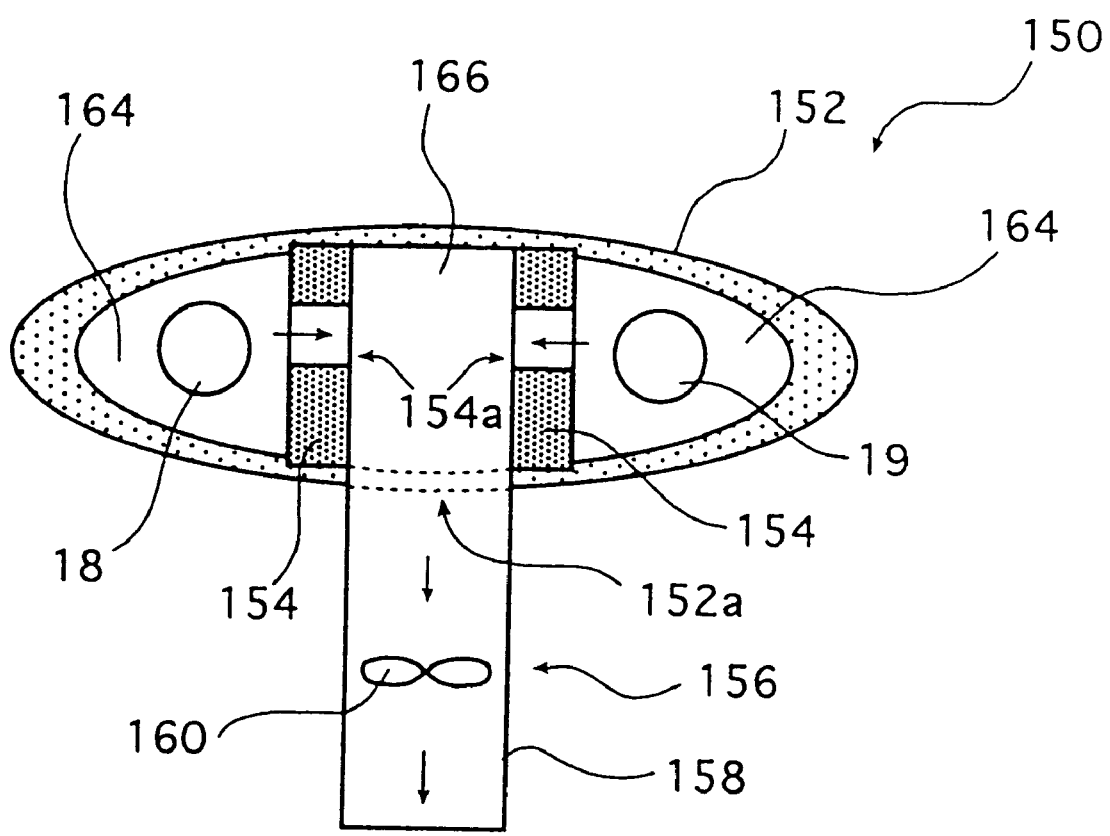
FIG. 11 is a partly horizontal sectional view of the merging unit according to an embodiment.

In FIGS. 10 and 11 is shown an example of the merging unit 150.

The merging unit 150 shown in these Figures includes the defining wall 152 having an elliptical or rectangular shape as seen from a top, throat walls 154, 154 and a stirring device 156. The defining wall 152 has reservoirs 164, 164 and a merging vessel 166 formed therein.

The defining wall 152 is a housing where the molten glass G supplied from the two downfalling pipes 18, 19 joins in a single flow. The defining wall has the lower ends of the two downfalling pipes 18, 19 inserted into an upper surface thereof away from each other at a certain distance, and the defining wall has a side formed with an outlet 152a to discharge the jointed molten glass G out of the defining wall 152. The present invention is not limited to such arrangement as long as the downfalling pipes 18, 19 are connected to the downstream stirring device 156.

The throat walls 154, 154 are plates which prevent the vortex caused by the stirring device 156 from traveling to the lower ends of the downfalling pipes 18, 19 to avoid the erosion in the lower ends of the downfalling pipes 18, 19, and which have throats 154a, 154a formed therein to discharge the molten glass G from the downfalling pipes 18, 19 in only a downstream direction. Two of the plates are provided in the defining wall 152 to correspond to the downfalling pipes 18, 19. By providing each of the two throat walls 154, 154 to separate a downstream side of each of the two downfalling pipes 18, 19, an upstream side of each of the throat walls 154, 154 in the defining wall 152 forms each of the reservoirs 164, 164, and a downstream side between the two throat walls 154, 154 in the defining wall 152 forms the merging vessel 166. In other words, the merging unit 150 has such arrangement that the molten glass G supplied and stored in the two reservoirs 164, 164 joins in the merging vessel 166 through the throats 154a, 154a in the throat walls, and the joined molten glass G is supplied to the stirring device 156 through a discharge port 152a.

The stirring device 156 stirs and equalizes the molten glass G which has joined in the merging vessel 166 in the defining wall 152. Various kinds of known stirring devices for stirring molten glass may be used, and there are no limitations on the stirring device. The stirring device 156 in the example shown includes a canal 158, a stirrer 160 and a driving motor 162.

The canal 158 ensures a space for stirring the molten glass G, communicates with the discharge port 152a in the defining wall 152, and has a capacity to house the stirrer 160 therein. It is preferable that the canal is formed to extend in the axial direction of the stirrer 160 (e.g. downwardly) at the position of the stirrer 160 in order to make stirring by the stirrer 160 effective, and that the canal is formed to extend in the horizontal direction or to have a rectangular shape on the upstream and downstream sides of the position of the stirrer.

The stirrer 160 stirs the molten glass G, and is constituted by a rotary shaft 160a having an upper end rotatably supported by the driving motor 162, and blades 160b carried on a lower end of the rotary shaft 160a. When the drive motor 162 is driven, the blades 160b are rotated through the rotary shaft 160a to forcibly stir and equalize the molten glass G led in the canal 158. Although there are no limitations on the material and the structure of the stirrer 160, it is preferable that the stirrer is made of platinum or platinum alloy, or that the stirrer is constituted by heat resisting material such as refractory material and heat resisting metal except for platinum and has a surface in contact with the molten glass provided with platinum lining or platinum alloy lining, in terms of avoidance of erosion by the molten glass G.

As the driving motor 162, various known driving measures can be used as long as the measures can stir the molten glass G.

By providing the merging unit 150 with such arrangement, the portion where the stirring device 156 stirs and the lower ends of the downfalling pipes 18, 19 are sufficiently isolated to prevent the vortex of the molten glass G caused by the stirring from reaching and eroding the lower edge of the downfalling pipes 18, 19 to improve the durability of these portions. In particular, even if the lower ends of the downfalling pipe 18, 19 are made of platinum or platinum alloy, it is extremely effective to avoid the erosion in the vicinity of the interface between the molten glass G and air since such interface is highly reactive.

There are no limitations on the molten glass G which can be dealt with by the vacuum degassing apparatus 100 according to the present invention. Example of the molten glass are soda-lime glass and boro-silica to glass. The vacuum degassing apparatus 100 according to the present invention can deal with a large amount of molten glass. The vacuum degassing apparatus according to the present invention is applicable to a large scale of plant wherein a large amount of treatment is required as in production of soda-lime glass.

An example of the process wherein the molten glass G is vacuum-degassed by the vacuum degassing apparatus 100 according to this mode and is continuously supplied to the successive treating vessel will be explained. Since the first degassing unit 102 and the second degassing unit 104 have the same structure, the operation of the first vacuum degassing unit 102 will be mainly described.

First, glass is molten in the melting vessel 24 to prepare the molten glass G. The temperature in the melting vessel is 1250–1450° C., preferably 1280–1320° C. in the case of soda-lime glass. The temperature in such range can sufficiently decrease the viscosity of the molten glass G to carry out the vacuum-degassing treatment effectively and to restrain the apparatus (in particular platinum or platinum alloy) from deteriorating. With regard to glass having another composition such as boro-silica to glass as well, it is preferable that the glass is molten at such a temperature to have a viscosity similar to the soda-lime glass.

Then, the inside of the vacuum housing 12 and the inside of the vacuum degassing vessel 14 are held at a vacuum state by a vacuum pump (not shown). Under the state, the glass G molten in the melting vessel 24 passes the upstream pit 26 provided to a downstream end of the melting vessel 24, rises in the uprising pipe 16, and is introduced into the vacuum degassing vessel 14. The molten glass G is degassed in the vacuum degassing vessel 14 under a depressurizing condition. At that time, the pressure of the gas phase in the vacuum degassing vessel 14 and that in the vacuum degassing vessel 14 of the second vacuum degassing unit 102 can be at the same pressure by the pressure-equalizing pipe 142 to provide the same composition history to the molten glass G which passes through both vacuum degassing units 102 and 104.

Next, the molten glass G after degassing is introduced into the merging unit 150 through the downfalling pipe 18, and are merged and stirred together with the molten glass G from the second vacuum degassing unit 104. Then, the molten glass is supplied to a successive forming unit (not shown).

Since the vacuum degassing apparatus 100 according to this mode has a dual structure with the first vacuum degassing unit 102 and the second vacuum degassing unit 104 included therein, the molten glass G is supplied into the respective vacuum degassing vessels by the two different uprising pipes, is discharged by the two different corresponding downfalling pipes, and are supplied into the merging unit 150.

Although the vacuum degassing apparatus 100 in the shown example has such a dual structure, the present invention is not limited to such a structure, and not less than three vacuum degassing units may be provided. In the latter case, the respective vacuum degassing units may be provided with respective uprising pipes and downfalling pipes, and all downfalling pipes may join at a single location. A plurality of uprising pipes all diverge from a single merging pipe. Or, some of a plurality of uprising pipes and some of plurality of downfalling pipes may stepwise diverge or join, all uprising pipes may be separated, or all downfalling pipes may join.

As explained in detail, in the vacuum degassing apparatus for molten glass according to the fifth mode of the present invention wherein the bubbles are removed from the molten glass continuously supplied, a large amount of the molten glass can be dealt with, and superior homogeneity can be provided to the molten glass while the apparatus can promptly cope with a change in production. The apparatus can be continuously operated even in maintenance.

It should be noted that the vacuum degassing apparatus for molten glass according to the first through fourth modes of the present invention and the parallel arrangement of vacuum degassing apparatus according to the fifth mode of the present invention are applicable not only to a siphon type vacuum degassing apparatus in the show examples but also a vacuum degassing apparatus with vessels horizontally located therein as shown in JP-A-5262530 and JP-A-7291633.

Although various examples have been described in detail with respect to the vacuum degassing apparatus for molten glass according to the present invention, the present invention is not limited to the examples. Many improvements or modifications may be made without departing from the scope of the invention.

What is claimed is:

1. A vacuum degassing apparatus for molten glass, comprising:

a vacuum housing where a vacuum is created;

a vacuum degassing vessel housed in the vacuum housing;

an introduction device communicated to the vacuum degassing vessel so as to introduce molten glass before degassing into the vacuum degassing vessel; and a discharge device communicated to the vacuum degassing vessel so as to discharge the molten glass after degassing from the vacuum degassing vessel;

wherein at least one of the introduction device and the discharge device includes a path to flow a large quantity of the molten glass, and at least a portion of the path that directly contacts the molten glass is constituted by refractory material having a porosity of not greater than 5%; and further wherein a cortex of the refractory material that directly contacts the molten glass is scalped by at least 5 mm.

2. A vacuum degassing apparatus for molten glass according to claim 1, wherein the introduction device comprising an uprising pipe and the discharge device comprises a downfalling pipe, and at least one of the uprising pipe and the downfalling pipe is constituted by refractory material having a porosity of not greater than 5%.

3. A vacuum degassing apparatus for molten glass according to claim 1, wherein the path of the vacuum degassing vessel has a rectangular section.

4. A vacuum degassing apparatus for molten glass according to claim 1, further comprising a cooling device for cooling the molten glass.

5. A vacuum degassing apparatus for molten glass according to claim 1, wherein the introduction device includes an uprising pipe and an extending pipe communicated to a lower end of the uprising pipe, and the discharge device includes a downfalling pipe and an extending pipe communicated to a lower end of the downfalling pipe, and wherein at least portions of the uprising pipe and the downfalling pipe that directly contact with the molten glass are constituted by refractory material having a porosity of not greater than 5%, and the extending pipes of the uprising pipe and the downfalling pipe are made of platinum or platinum alloy.

6. A vacuum degassing apparatus for molten glass according to claim 5, wherein at least one of the extending pipes has an upper end provided with a flange, and the extending pipe is fixed to the uprising pipe or the downfalling pipe by inserting and sandwiching the flange in a joint in a furnace lining.

7. A vacuum degassing apparatus for molten glass according to claim 1, wherein the introduction device includes an uprising pipe and an upstream connecting passage for communicating between the uprising pipe and a melting vessel with a free surface of the molten glass therein or an upstream open channel with a free surface of the molten glass therein;

the discharge device includes a downfalling pipe and a downstream connecting passage for communicating between the downfalling pipe and a downstream open channel with a free surface of the molten glass therein or a treating vessel with a free surface of the molten glass therein;

the upstream connecting passage, the uprising pipe, the vacuum degassing vessel, the downfalling pipe and the downstream connecting passage form continuous closed passages; and portions of the continuous closed passages that directly contact with the molten glass are constituted by refractory material having a porosity of not greater than 5%.

8. A vacuum degassing apparatus for molten glass according to claim 7, wherein the vacuum housing comprises a metallic casing which encloses the vacuum degassing vessel, and portions of the uprising pipe, the downfalling pipe and the upstream and downstream connecting passages, and a space between the vacuum degassing vessel and the vacuum housing and spaces between the portions of the uprising pipe, the downfalling pipe and the upstream and downstream connecting passages and the vacuum housing have a multi-layered structure in section which is filled with thermal insulation material made of firebricks.

9. A vacuum degassing apparatus for molten glass according to claim 1, wherein the vacuum degassing vessel has a pressure of 1/20–1/3 atmosphere therein, and the molten glass that has a viscosity of not greater than $10^{4.5}$ poise flows at a current of not greater than 50 mm/sec in the vacuum degassing vessel.

10. A parallel arrangement of vacuum degassing apparatus comprising;

a plurality of vacuum degassing units for vacuum-degassing molten glass supplied from a melting vessel; and a merging unit for merging the molten glass supplied from the vacuum degassing units, stirring the merged molten glass and supplying the stirred molten glass to a downstream side;

wherein each of the vacuum degassing units includes a vacuum housing where a vacuum is created, a vacuum degassing vessel housed in the vacuum housing to vacuum-degas the molten glass, an introduction device communicated to the vacuum degassing vessel so as to introduce the molten glass before degassing into the vacuum degassing vessel; and a discharge device communicated to the vacuum degassing vessel so as to discharge the molten glass after degassing from the vacuum degassing vessel into the merging unit;

wherein a pressure-equalizing pipe is provided to communicate between the vacuum degassing units; and wherein the pressure-equalizing pipe is provided with a cock to close communication between the vacuum degassing vessels.

11. A parallel arrangement of vacuum degassing apparatus according to claim 10, wherein the introduction device comprises an uprising pipe to rise the molten glass before degassing so as to introduce the molten glass into the vacuum degassing vessel, and the discharging device comprises a downfalling pipe to downwardly withdraw the molten glass after degassing from the vacuum degassing vessel so as to lead out the molten glass into the merging unit.

12. A parallel arrangement of vacuum degassing apparatus according to claim 10, wherein the merging unit includes a plurality of reservoirs, each of the reservoirs communicated to each of the introduction devices, a merging vessel communicated to the reservoirs through throats, and a stirring vessel communicated to a downstream side of the merging unit.

13. A vacuum degassing apparatus for molten glass comprising:

a plurality of vacuum degassing units for vacuum-degassing molten glass supplied from a melting vessel; and a merging unit for merging the molten glass supplied from the vacuum degassing units, stirring the merged molten glass and supplying the stirred molten glass to a downstream side;

wherein each of the vacuum degassing units includes a vacuum housing where a vacuum is created, a vacuum degassing vessel housed in the vacuum housing to vacuum-degas the molten glass, an introduction device communicated to the vacuum degassing vessel so as to introduce the molten glass before degassing into the vacuum degassing vessel, and a discharge device communicated to the vacuum degassing vessel so as to discharge the molten glass after degassing from the vacuum degassing vessel into the merging unit;

wherein a pressure-equalizing pipe is provided to communicate between the vacuum degassing units;

wherein at least portions of the introduction device, the vacuum degassing vessel and the discharge device that directly contact the molten glass are constituted by refractory material having a porosity of not greater than 5%; and wherein a cortex of the refractory material is scalped by at least 5 mm.

14. A vacuum degassing apparatus for molten glass according to claim 13, wherein the refractory material is electro-cast refractory material or fine burned refractory material.

15. A vacuum degassing apparatus for molten glass according to claim 13, wherein the refractory material has the cortex that directly contacts the molten glass.

16. A vacuum degassing apparatus for molten glass, comprising:

a vacuum housing where a vacuum is created;

a vacuum degassing vessel housed in the vacuum housing;

an introduction device communicated to the vacuum degassing vessel so as to introduce molten glass before degassing into the vacuum degassing vessel; and a discharge device communicated to the vacuum degassing vessel so as to discharge the molten glass after degassing from the vacuum degassing vessel;

wherein the vacuum degassing vessel includes a path to flow a large quantity of the molten glass and a degassing space, and a portion of the path that directly contacts the molten glass is constituted by refractory material having a porosity of not greater than 5%; and further wherein a cortex of the refractory material that directly contacts the molten glass is scalped by at least 5 mm.

* * * * *